United States Patent
Ohkubo et al.

[11] Patent Number: 6,079,531
[45] Date of Patent: *Jun. 27, 2000

[54] LOCKUP DAMPER, LOCKUP MECHANISM AND DAMPER MECHANISM OF TORQUE CONVERTER

[75] Inventors: Mamoru Ohkubo; Hirotaka Fukushima, both of Neyagawa, Japan

[73] Assignee: Exedy Corporation, Osaka, Japan

[*] Notice: This patent is subject to a terminal disclaimer.

[21] Appl. No.: 09/296,813

[22] Filed: Apr. 23, 1999

Related U.S. Application Data

[62] Division of application No. 08/976,622, Nov. 24, 1997.

[30] Foreign Application Priority Data

Nov. 26, 1996 [JP] Japan ................................. 8-314920
Jan. 10, 1997 [JP] Japan ................................. 9-003382

[51] Int. Cl.[7] ..................................................... F16D 33/00

[52] U.S. Cl. ........................... 192/3.29; 192/205; 192/213

[58] Field of Search ................................... 192/3.29, 205, 192/213, 55.61; 464/66, 68, 100, 98

[56] References Cited

U.S. PATENT DOCUMENTS

| | | | |
|---|---|---|---|
| 5,156,066 | 10/1992 | Janiszewski | 464/66 X |
| 5,186,293 | 2/1993 | Fujimoto | 192/3.28 |
| 5,218,884 | 6/1993 | Rohrle | |
| 5,743,365 | 4/1998 | Makino | 192/3.29 |
| 5,772,515 | 6/1998 | Yamakawa et al. | |
| 5,784,929 | 7/1998 | Abraham et al. | |
| 5,810,140 | 9/1998 | Billet et al. | |
| 5,813,506 | 9/1998 | Maeda et al. | 192/3.29 |
| 5,868,228 | 2/1999 | Fukushima | 192/3.29 |
| 5,941,354 | 8/1999 | Fukushima et al. | 192/3.29 X |

Primary Examiner—Charles A. Marmor
Assistant Examiner—Roger Pang
Attorney, Agent, or Firm—Shinjyu an Intellectual Property Firm

[57] ABSTRACT

A lockup damper included in a lockup mechanism 8 of a torque converter 1 includes a piston member 9, a driven member 10, coil springs 13 and seat members 40. The coil spring 13 is arranged between the piston member 9 and the driven member 10. The seat member 40 is attached to the driven member 10, has a loose-fit portion 40c loosely fitted to the end of the coil spring 13, and restricts the radially outward movement of the end of the coil spring 13 by the loose-fit portion 40c fitted into the coil spring 13.

9 Claims, 14 Drawing Sheets

LOCKUP DAMPER, LOCKUP MECHANISM AND DAMPER MECHANISM OF TORQUE CONVERTER

This is a Division of application Ser. No. 08/976,622, filed Nov. 24, 1997.

BACKGROUND OF THE INVENTION

A. Field of the Invention

The present invention relates to a damper mechanism, and in particular to a lockup damper and a lockup mechanism in a torque converter for mechanically transmitting a torque from an input rotary member to an output rotary member.

B. Description of the Background Art

In general, the damper mechanism transmits a torque from an input rotary member to an output rotary member, and simultaneously operates to absorb or damp a vibration transmitted from the input rotary member toward the output rotary member. A lockup mechanism disposed inside the torque converter is one example of the above damper mechanism.

The torque converter is internally provided with three kinds of vane wheels, i.e., an impeller, a turbine and a stator, and is operable to transmit a torque through a working fluid filling an internal space thereof. The impeller is fixed to a front cover coupled to the input rotary member. The working fluid flowing from the impeller to the turbine through the stator transmits a torque from the impeller to the turbine, and then is transmitted to the output rotary member coupled to the turbine.

The lockup mechanism is disposed between the turbine and the front cover for mechanically coupling the front cover and the turbine together and thereby directly transmitting the torque from the input rotary member to the output rotary member.

Usually, the lockup mechanism has a piston member which can be pressed against the front cover, a retaining plate fixed to the piston member, coil springs carried by the retaining plate and a driven member elastically coupled, in a rotating direction of the mechanism, to the piston member through the coil springs. The driven member is fixed to the turbine coupled to the output rotary member. The components of the lockup mechanism also form a lockup damper mechanism for absorbing and damping an applied vibration.

When the lockup mechanism operates, the piston member slides on or is pressed to the front cover so that the torque is transmitted from the front cover to the piston member, and then is transmitted to the turbine through the coil springs. The lockup mechanism transmits the torque, and also operates to absorb or damp the torsional or angular vibration owing to the lockup damper. The coil springs are repetitively compressed between the retaining plate fixed to the piston member and the driven member, and thereby slide on the retaining plate so that the vibration is damped. A minute torsional vibration is absorbed by repetitive elastic deformation (expansion and contraction) of the coil springs.

In the conventional lockup damper described above, outer portions, in the radial direction of the damper, of the coil springs are covered with outer bent portions of the retaining plate, i.e., outer peripheral portions which are bent.

When the lockup mechanism operates and the respective portions rotate, centrifugal forces act on the coil springs and other portions of the torque convertor so that the coil springs as well as spring seats supporting the opposite ends of the coil springs are pressed against the outer bent portions of the retaining plate. When the coil springs in this state expand and contract, the ends of the coil springs and the spring seats attached to the spring ends cause a frictional resistance with respect to the outer peripheral portions so that the damper characteristics change. In particular, the minute torsional vibration cannot be absorbed sufficiently due to presence of the frictional resistance.

A large torsional vibration often occurs during clutch engaging and disengaging operations of the lockup mechanism. In this case, the frictional resistance, if present, can effectively absorb the vibration. The damper characteristics having the above characteristics are effective in some kinds of vehicles.

The lockup mechanism provided at its radially outer portion with the coil or torsion springs can reduce an axial size of the torque converter compared with the lockup mechanism provided at its radially middle portion with the torsion springs, but cannot ensure a sufficiently large torsion angle compared with the latter. If the torsion springs are shifted from the middle position to the outer position without changing the size of the springs, an allowed maximum torsion angle between the input rotary member and the output rotary member decreases. As a result, the allowed maximum torsion angle of the lockup mechanism decreases, which reduces the property of absorbing the torsional vibration particularly in a low rotation speed range of the engine.

In order to overcome the above problems, such a structure may be employed that two or more torsion springs are arranged in series with an intermediate member(s) therebetween for increasing a total compressible size of the elastic member. This structure can provide the large torsional angle of the lockup mechanism.

However, the torsion spring having a circumferentially increased size is likely to be deformed such that a circumferentially middle portion protrudes radially outward when compressed. This tends to increase a frictional resistance between the torsion spring and a member disposed radially outside the spring. Since the lockup mechanism in the engaged state rotates together with the torque converter, a centrifugal force acts on the torsion springs. Due to this, the torsion springs tend to move radially outward and cause a frictional resistance with members arranged outside the springs. When the frictional resistance between the torsion springs and the outer members increases, the torsional vibration cannot be absorbed sufficiently.

SUMMARY OF THE INVENTION

An object of the invention is to suppress a frictional resistance of an end of a coil spring (elastic member) or a spring seat (seat member) attached to the end of the coil spring with respect to an outer bent portion (a holding portion of the input member) of the retaining plate, and thereby improve a property of absorbing a minute torsional vibration.

Another object of the invention is to provide a lockup damper or a damper mechanism which can achieve the above object and can also effectively damp a relatively large vibration occurring at the times of engagement and disengagement of a clutch.

Still another object of the invention is to provide a lockup mechanism of a torque converter having elastic members arranged in series, in which a radially outward movement of the elastic member is restricted, and thereby a frictional resistance between the elastic member and another member is reduced.

According to a first aspect of the invention, a lockup damper of a torque converter is included in a lockup mechanism of the torque converter. The lockup mechanism is provided for mechanically transmitting a torque from an input rotary member to an output rotary member. The lockup damper is operable to absorb or damp a vibration transmitted from the input rotary member to the output rotary member. The lockup damper of the torque converter comprises an input member, an output member, a coil-shaped elastic member and a seat member. The input member is supplied with the torque from the input rotary member. The output member outputs the torque to the output rotary member. The elastic member is arranged between the input member and the output member. The seat member is attached to the input or output member, and has a loose-fit portion to be loosely fitted to an end of the elastic member. The seat member restricts a radially outward movement of the end of the elastic member fitted to the loose-fit portion.

The lockup damper thus constructed absorbs and damps a vibration transmitted from the input rotary member to the output rotary member during an operation of the lockup mechanism to transmit the torque from the input rotary member to the output rotary member and operations of the lockup mechanism to engage and disengage the input and output rotary members with and from each other, respectively.

When a torsional vibration is transmitted from the input rotary member to the input member, this vibration is absorbed and damped by expansion and contraction of the elastic member arranged between the input member and the output member. During this operation, a centrifugal force is applied radially outwardly to the elastic member. In the lockup damper of this aspect, the seat member is attached to the input or output member, and a radially outward movement of the end of the elastic member is restricted in the state that the loose-fit portion of the seat member is fitted to the end of the elastic member. Thereby, the end of the elastic member subjected to the centrifugal force is restrained from moving radially outwardly so that it is possible to restrain occurrence of the frictional sliding between the end of the elastic member and another member disposed radially outside the elastic member. Therefore, the torsional vibration and particularly the minute torsional vibration applied to the input member can be sufficiently absorbed.

In conventional lockup dampers and particularly a lockup damper provided with a coil-shaped elastic member which does not have an arc-shaped form but has a straight form, a frictional resistance between an end of the elastic member and another member arranged radially outside the elastic member adversely affects a property of absorbing a minute torsional vibration in many cases.

Accordingly, the structure of this aspect is particularly effective in the lockup damper having the elastic member of a straight form.

According to a second aspect, the lockup damper of the torque converter of the first aspect further has such a feature that the input member has a holding portion disposed radially outside the elastic member and is circumferentially engaged with the elastic member. The output member is fixed to the output rotary member, and is circumferentially engaged with the elastic member. The seat member is attached to the output member.

The elastic member is circumferentially engaged with the input and output members and thereby elastically couples both the members together. The seat member is attached to the output member, restricts the radially outward movement of the elastic member having the end fitted to the loose-fit portion of the seat member, and circumferentially supports the elastic member.

When the lockup damper is operating, the input and output members rotate relatively to each other. In a conventional lockup damper which is not provided with means for restricting radially outward movement of the end of the elastic member, frictional sliding occurs between the elastic member forced radially outwardly by a centrifugal force and a holding portion of the input member arranged radially outside the elastic member when a relative rotation occurs between the input and output members. If the elastic member has a straight form, the sliding occurs particularly between the end of the elastic member and the holding portion, which adversely affects the property of absorbing a minute torsional vibration.

According to the above aspect of the invention, the lockup damper suppresses a radially outward movement of the end of the elastic member which rotates relatively to the holding portion of the input member so that contact and sliding between the end and the holding portion of the input member are prevented or suppressed. This improves the minute torsional vibration absorbing property.

When a relatively large vibration occurs, e.g., due to engagement of a clutch, the end of the elastic member may be disengaged from the loose-fit portion of the seat member and thereby may come into contact with the holding portion of the input member, depending on the direction of the relative rotation between the input and output members. In this case, however, the elastic member does not transmit a torque and therefore a vibration between the input and output members, or the end of the elastic member rotates together with the input member. Therefore, when the elastic member is not fitted to the loose-fit portion, a necessity to restrict the radially outward movement of the end of the elastic member is small.

According to a third aspect, the lockup damper of the torque converter of the second aspect further has such a feature that the seat member is attached to a portion of the output member opposed to the forward end, in the rotating direction of the torque converter, of the elastic member.

In this aspect, the seat member which can restrict the radially outward movement of the end of the elastic member is attached only to the portion opposed to the forward end, in the rotating direction of the torque converter, of the elastic member, and is not attached to the rear portion, in the rotating direction of the torque converter, of the elastic member.

The input member normally rotates in the rotating direction of the torque converter. The input member pushes, in the rotating direction of the torque converter, the rear end, in the torque converter rotating direction, of the elastic member, and this pushing force is transmitted to the output member from the end of the forward end, in the torque converter rotating direction, of the elastic member, so that the output member rotates in the torque converter rotating direction. For efficiently absorbing the minute torsional vibration by the elastic member during this operation, it is desired that frictional sliding between the elastic member and the holding portion of the input member is reduced so as to prevent transmission of the vibration from the holding portion of the input member through the end of the elastic member to the output member. In this aspect, the seat member is attached to the portion of the output member opposed to the forward end, in the torque converter rotating direction, of the elastic member for restricting the radially outward movement of the end of the elastic member. Thereby, the sliding between the forward end, in the torque converter rotating direction, of the elastic member and the holding portion is prevented or suppressed, and an unnecessary frictional resistance is eliminated or reduced compared with the prior art. Thereby, the minute torsional vibration can be sufficiently absorbed. The seat member is not attached to the portion of the output member opposed to the rear end, in the torque converter rotating direction, of the elastic member. During the above operation of the lockup damper, the elastic member, of which rear end, in the torque converter rotating direction, is opposed to the output member, does not transmit the torque, or the rear end thereof in the torque converter rotating direction rotates together with the input member. Therefore, even if the elastic member is pushed radially outwardly to come into contact with the holding portion, no influence is substantially applied to the damper characteristics (property of absorbing the minute torsional vibration).

A relatively large torsional vibration occurs due to a shock or the like when the clutch of the lockup mechanism is being engaged or disengaged. In this case, the input and output members repeat a large relative rotation in both the rotating directions so that the vibration is damped. When the output member rotates relatively to the input member in the direction opposite to the torque converter rotating direction, the forward end, in the torque converter rotating direction, of the elastic member opposed to the output member is restrained from moving radially outwardly so that there is no or only a little frictional resistance between the end of the elastic member and the holding portion. Meanwhile, when the output member rotates relatively to the input member in the same direction as the rotating direction of the torque converter, the rear end, in the torque converter rotating direction, of the elastic member opposed to the output member can move radially outwardly without a restriction, and therefore causes a large frictional resistance with respect to the holding portion. Owing to this frictional resistance between the holding portion and the rear end of the elastic member, in the torque converter rotating direction, of the elastic member, it is possible to damp efficiently the torsional vibration which occurs during the engaging and disengaging operations of the clutch. The end of the elastic member engaging with the input member rotates together with the holding portion of the input member, and therefore does not substantially generate the frictional resistance.

According to a fourth aspect, the lockup damper of the torque converter of the first aspect further has such a feature that, the loose-fit portion of the seat member has an end of a converging form.

According to this aspect, even when the elastic member is temporarily disengaged from the loose-fit portion due to the relative rotation between the input and output members, the end of the coil-shaped elastic member will be reliably fitted to the loose-fit portion again when the input and output members thereafter rotate relatively to each other in the opposite direction. For this purpose, the loose-fit portion has the end in the converging form.

According to a fifth aspect, the lockup damper of the torque converter of the first aspect further has such a feature that the lockup damper further comprises a holding member disposed radially outside the elastic member for rotation together with one of the input member and the output member. The seat member restricts the radially outward movement of one end of the elastic member.

In this aspect, the seat member restricts only an end of the elastic member, and does not restrict the radially outward movement of the other end.

The input member normally rotates in the rotating direction of the torque converter. The input member pushes the rear end, in the torque converter rotating direction, of the elastic member in the rotating direction, and this force is transmitted from the forward end, in the torque converter rotating direction, of the elastic member to the output member so that the output member rotates in the rotating direction of the torque converter. For efficiently absorbing the minute torsional vibration by the elastic member, it is desired that the frictional sliding between the elastic member and the holding member arranged radially outside the elastic member occurs to a small extent. In this aspect, one end of the elastic member is restrained from the radially outward movement so that sliding between the holding member and the one end of the elastic member rotating relatively to the holding member is prevented or suppressed. Therefore, an unnecessary frictional resistance can be smaller than that in the prior art. Thereby, the minute torsional vibration can be sufficiently absorbed.

A relatively large torsional vibration occurs due to a shock or the like during the engaging and disengaging operations of the clutch of the lockup mechanism. In this case, the input and output members repeat a large relative rotation in both the rotating directions so that the vibration is damped. When the output member rotates relatively to the input member in one of the directions, an end of the elastic member is restrained from moving radially outwardly so that there is no or only a little frictional resistance between the end of the elastic member and the holding portion arranged radially outside the elastic member. Meanwhile, when the output member rotates relatively to the input member in the other direction, the other end of the elastic member can move radially outward without a restriction, and therefore causes a large frictional resistance with respect to the holding member. Owing to this frictional resistance between the holding member and the other end of the elastic member, it is possible to damp efficiently the torsional vibration which occurs during the engaging and disengaging operations of the clutch.

According to a sixth aspect, of the invention, a lockup damper of a torque converter is included in a lockup mechanism of the torque converter. The lockup mechanism is provided for mechanically transmitting a torque from an input rotary member to an output rotary member. The lockup damper is operable to absorb or damp a vibration transmitted from the input rotary member to the output rotary member. The lockup damper of the torque converter includes an input member, an output member, an elastic member and a seat member. The input member is supplied with the torque from the input rotary member. The output member outputs the torque to the output rotary member. The elastic member is arranged between the input member and the output member. The seat member is attached to an end of the elastic member, and has an engagement portion engageable with at least one of the input and output members. The seat member restricts a radially outward movement of the end of the elastic member with its engagement portion engaged with at least one of the input and output members.

The lockup damper thus constructed absorbs and damps a vibration transmitted from the input rotary member to the output rotary member during an operation of the lockup mechanism to transmit the torque from the input rotary member to the output rotary member and operations of the lockup mechanism to engage and disengage the input and output rotary members with and from each other, respectively.

When a torsional vibration is transmitted from the input rotary member to the input member, this vibration is absorbed and damped by compression or the like of the elastic member arranged between the input member and the output member. During this operation, a centrifugal force is applied radially outwardly to the elastic member. In this aspect, the seat member is attached to the end of the elastic member, and the radially outward movement of the end of the elastic member is restricted by the seat member having the engagement portion engaged with at least one of the input and output members. Thereby, the end of the elastic member subjected to the centrifugal force is restrained from moving radially outwardly so that it is possible to restrain occurrence of the frictional sliding between the end of the elastic member and another member disposed radially outside the elastic member. Therefore, the torsional vibration and particularly the minute torsional vibration applied to the input member can be further absorbed.

In conventional lockup dampers and particularly a lockup damper provided with an elastic member which does not have an arc-shaped form but has a straight form, a frictional resistance between an end of the elastic member and another member arranged radially outside the elastic member adversely affects properties of the lockup damper and particularly property of absorbing a minute torsional vibration in many cases. In contrast to this, the structure of the lockup damper can effectively operate.

According to a seventh aspect, the lockup damper of the torque converter of the sixth aspect further has such a feature that the input member has a holding portion disposed radially outside the elastic member and is circumferentially engaged with the elastic member. The output member is fixed to the output rotary member, and is circumferentially engaged with the elastic member. The elastic member has a coil-shaped form. The seat member has a first engagement portion, a second engagement portion and a support portion. The first engagement portion is engageable with the input member. The second engagement portion is engageable with the output member. The support portion circumferentially supports the elastic member. The seat member restricts the radially outward movement of the end of the elastic member with at least one of the first and second engagement portions engaged with the input or output member.

The elastic member is circumferentially engaged with the input and output members and thereby elastically couples both the members together.

When the lockup damper is operating, the input and output members rotate relatively to each other. In a conventional lockup damper which is not provided with means for restricting radially outward movement of the end of the elastic member, frictional sliding occurs between the elastic member forced radially outwardly by a centrifugal force and a holding portion of the input member arranged radially outside the elastic member when a relative rotation occurs between the input and output members. If the elastic member has a straight form, the sliding occurs particularly between the end of the elastic member and the holding portion, which adversely affects the property of absorbing a minute torsional vibration.

According to the lockup damper of this aspect, the seat member attached to the end of the elastic member is engaged with the input or output member to restricts the radially outward movement of the end of the elastic member engaging seated on the seat member. When the first engagement portion is not engaged with the input member due to the relative rotation between the input and output members, the second engagement portion is engaged with the output member. When the second engagement portion of the seat member is not engaged with the output member, the first engagement portion is engaged with the input member. Thereby, the radially outward movement of the elastic member is restricted. Therefore, the frictional resistance due to the sliding between the end of the elastic member and the input member is suppressed, and therefore the property of absorbing the minute torsional vibration is improved.

According to an eighth aspect, the lockup damper of the torque converter of the seventh aspect further has such a feature that the first and second engagement portions are formed of three claws formed at the seat member and defining two grooves for loosely fitting the input and output members thereinto, respectively. Each of these claws has an inclined surface forming a tip end in a converging form.

In this aspect, when the input member or the output member is disengaged from the grooves formed between the three claws due to the relative rotation between the input and output members, the input or output member will be reliably fitted into the groove when the input and output members relatively rotates in the opposite direction. For this purpose, the claw has the inclined surface forming the tip end in the converging form.

According to a ninth aspect, the lockup damper of the torque converter of the sixth aspect further has such a feature that the input member has a holding portion arranged radially outside the elastic member. The seat member has an engagement portion engageable with the output member and is attached to the forward end, in the rotating direction of the torque converter, of the elastic member. The seat member restricts the radially outward movement of the end of the elastic member when the engagement portion is engaged with the output member.

In this aspect, the seat member capable of restricting the radially outward movement of the end of the elastic member is attached only to the forward end, in the rotating direction of the torque converter, of the elastic member, and is not attached to the rear end, in the rotating direction of the torque converter, of the elastic member.

The input member usually rotates in the rotating direction of the torque converter. The input member pushes the rear end, in the rotating direction of the torque converter, of the elastic member in the rotating direction, and the pushing force is transmitted from the forward end, in the rotating direction of the torque converter, of the elastic member to the output member, so that the output member rotates in the rotating direction of the torque converter. For efficiently absorbing the minute torsional vibration by the elastic member during this operation, the frictional sliding between the elastic member and the holding portion of the input member is desired to be small. In this aspect, since the seat member is attached to the forward end, in the torque converter rotating direction, of the elastic member, the sliding between the forward end, in the torque converter rotating direction, of the elastic member and the holding portion is prevented or suppressed, so that an unnecessary frictional resistance is eliminated or reduced compared with the prior art. Thereby, the property of absorbing the minute torsional vibration is improved. The seat member is not attached to the rear end, in the rotating direction of the torque converter, of the elastic member. During the above operation of the lockup damper, the rear end, in the torque converter rotating direction, of the elastic member rotates together with the input member. Therefore, even if the end of the elastic member is pushed radially outward to come into contact with the holding portion, this does not substantially affect the damper characteristics (minute torsional vibration absorbing property).

During the engaging and disengaging operations of the clutch of the lockup mechanism, a relatively large vibration occurs due to a shock or the like. In this case, the input and output members repeat the relative rotation to damp the vibration. In this aspect, when the output member rotates relatively to the input member in the direction opposite to the torque converter rotating direction, the forward end, in the torque converter rotating direction, of the elastic member is restrained from the radially outward movement owing to the engagement of the engagement portion of the seat member with the output member, and therefore produces no or only a small frictional resistance. Conversely, when the output member rotates relatively to the input member in the same direction as the torque converter rotating direction, a large frictional resistance occurs between the rear end, in the torque converter rotating direction, of the elastic member and the holding portion, because the seat member for restricting the radially outward movement is not attached to the rear end, in the torque converter rotating direction, of the elastic member. Owing to the frictional resistance between the rear end, in the torque converter rotating direction, of the elastic member and the holding portion, it is possible to damp efficiently the vibration which occurs during the engaging and disengaging operations of the clutch. The end of the elastic member engaged with the input member rotates together with the holding portion of the input member, and therefore does not substantially generate the frictional resistance.

According to a tenth aspect, the lockup damper of the torque converter of the sixth aspect further comprises a holding member arranged radially outside the elastic member and being rotatable together with one of the input and output members. The seat member restricts the radially outward movement of an end of the elastic member.

In this aspect, the seat member restricts only one of the ends of the elastic member and does not restrict the radially outward movement of the other end.

The input member usually rotates in the rotating direction of the torque converter. The input member pushes the rear end, in the torque converter rotating direction, of the elastic member in the rotating direction, and the pushing force is transmitted from the forward end, in the torque converter rotating direction, of the elastic member to the output member, so that the output member rotates in the torque converter rotating direction. For efficiently absorbing the minute torsional vibration by the elastic member during this operation, the frictional sliding between the elastic member and the holding member is desired to be small. The radially outward movement of one end of the elastic member is restricted, the sliding between the one end of the elastic member relatively to the holding member and the elastic member is eliminated or suppressed, so that an unnecessary frictional resistance is reduced compared with the prior art. Thereby, the minute torsional vibration is sufficiently absorbed.

During the engaging and disengaging operations of the clutch of the lockup mechanism, a relatively large vibration occurs due to a shock or the like. In this case, the input and output members repeat the large relative rotation in both the rotating directions to damp the vibration. In this aspect, when the output member rotates relatively to the input member in one of the directions, an end of the elastic member is restrained from the radially outward movement, and therefore produces no or only a small frictional resistance with respect to the holding member arranged radially outside the elastic member. Conversely, when the output rotates relatively to the input member in the other direction, a large frictional resistance occurs between the other end of the elastic member and the holding member, because the other end of the elastic member is not restrained from the radially outward movement. Owing to the frictional resistance between the other end of the elastic member and the holding member, it is possible to damp efficiently the vibration which occurs during the engaging and disengaging operations of the clutch.

According to an eleventh aspect of the invention, a damper mechanism is provided for mechanically transmitting a torque from an input rotary member to an output rotary member while absorbing and damping a vibration transmitted from the input rotary member to the output rotary member, and comprises an input member, an output member, an elastic member, a holding member and a seat member. The input member is supplied with the torque from the input rotary member. The output member outputs the torque to the output rotary member. The elastic member elastically couples the input member and the output member together in the rotating direction. The holding member is arranged radially outside the elastic member, and rotates together with one of the input and output members. The seat member is arranged between an end of the elastic member and the input or output member for circumferentially supporting the elastic member and restricting a radially outward movement of the one end of the elastic member.

When a torsional vibration is transmitted from the input rotary member to the input member, this vibration is absorbed and damped by compression or the like of the elastic member arranged between the input member and the output member. During this operation of the damper mechanism, a centrifugal force is applied radially outwardly to the elastic member. Therefore, if the radially outward movement of the end of the elastic member is not restricted, a frictional resistance is generated by the sliding between the end of the elastic member and the holding member arranged radially outside the elastic member.

The input member usually rotates in the rotating direction of the input rotary member. The input member pushes the rear end, in the rotating direction of the input rotary member, of the elastic member in the rotating direction, and the pushing force is transmitted from the forward end, in the rotating direction of the input rotary member, of the elastic member to the output member, so that the output member rotates in the rotating direction of the input rotary member. For efficiently absorbing the minute torsional vibration by the elastic member during this operation, the frictional sliding between the elastic member and the holding member is desired to be small.

During the engaging and disengaging operations of the clutch of the lockup mechanism, a relatively large vibration occurs due to a shock or the like. In this case, the input and output members repeat the large relative rotation in both the rotating directions to damp the vibration. In some cases, the vibration can be damped efficiently by utilizing a large frictional resistance, and therefore it is desired to generate positively the frictional resistance between the end of the elastic member and the holding member.

The structure in this aspect restricts the radially outward movement of only the one end of the elastic member, and does not restrict the radially outward movement of the other end. Therefore, when the output member rotates relatively to the input member with respect to the input member, the radially outward movement of the one end of the elastic member is restricted, and the frictional resistance between the one end and the holding member is suppressed. Thereby, the minute torsional vibration transmitted to the input member can be absorbed sufficiently. Conversely, when the output member rotates relatively to the input member in the other rotating direction, a relatively large frictional resistance occurs due to the sliding between the other end and of the elastic member and the holding member because the radially outward movement of the other end is not restricted. By the frictional resistance between the other end of the elastic member and the holding member, it is possible to damp efficiently the vibration which occurs during the engaging and disengaging operations of the clutch.

According to a twelfth aspect, the damper mechanism of the eleventh aspect further has such a feature that the seat member has an engagement portion engageable with an end of the elastic member and is attached to the input or output member.

In this aspect, the seat member is attached to the input member or the output member, and the engagement portion of the seat member is engaged with the one end of the elastic member to restrict the radially outward movement of the one end of the elastic member.

According to a thirteenth aspect, the damper mechanism of the eleventh aspect further has such a feature that the seat member has an engagement portion to be engaged with at least one of the input and output members, and is attached to one end of the elastic member.

In this aspect, the seat member is attached to the end of the elastic member, and the engagement portion of the seat member is engaged with the input or output member for restricting the radially outward movement of the one end of the elastic member.

According to a fourteenth aspect, a lockup mechanism of a torque converter is provided for mechanically transmitting a torque from an input rotary member to an output rotary member in a first rotation direction while absorbing and damping a vibration transmitted from the input rotary member to the output rotary member. The lockup mechanism comprises a damper, an input member and an output member. The damper has a first elastic member, a second elastic member and an intermediate member. The second elastic member is arranged forward in a second rotating direction of the torque converter with respect to the first elastic member. The intermediate member has an intermediate support portion arranged between the forward end, in the second rotating direction, of the first elastic member and the forward end, in the first rotating direction, of the second elastic member for allowing torque transmission between the first and second elastic members. The input member includes a circular plate-like piston, an input support portion and a first movement restricting portion. The circular plate is frictionally engageable and dis-engagable with the input rotary member, and is provided at its outer peripheral portion with the damper. The input support portion is arranged at the radially outer portion of the piston, and supports the forward end, in the first rotating direction, of the first elastic member and the forward end, in the second rotating direction, of the second elastic member. The first movement restricting portion restricts the radially outward movement of the forward end, in the first rotating direction, of the first elastic member and the forward end, in the second rotating direction, of the second elastic member. The output member has an output support portion and a second movement restricting portion. The output member outputs the torque to the output rotary member. The output support portion support the forward end, in the first rotating direction, of the first elastic member and the forward end, in the second rotating direction, of the second elastic member. The second movement restricting portion restricts the radially outward movement of the forward end, in the first rotating direction, of the first elastic member and the forward end, in the second rotating direction, of the second elastic member.

According to the lockup mechanism of the fourteenth aspect, when the piston of the input member is coupled to the input rotary member, the torque is transmitted from the input rotary member to the output rotary member through the lockup mechanism. In the lockup mechanism, the input support portion of the input member moves the damper to push the output support portion of the output member.

When a torsional vibration is transmitted from the input rotary member to the lockup mechanism, the input and output members rotate relatively to each other, and the damper, i.e., the first and second elastic members are compressed in the rotating direction between the input and output support portions. In this aspect, since the first and second elastic members are arranged in series with the intermediate support portion of the intermediate member therebetween, so that characteristics exhibiting a large maximum torsional angle can be ensured. The first movement restricting portion provided at the input member and the second movement restricting portion provided at the output member restrict the radially outward movement of the circumferentially opposite ends of the damper (i.e., the forward end, in the first rotating direction, of the first elastic member and the forward end, in the second rotating direction, of the second elastic member). As a result, the first and second elastic members which are compressed in the rotating direction are unlikely to interfere with other members, so that the frictional resistance is reduced.

According to a fifteenth aspect, the lockup mechanism of the fourteenth aspect further has such a feature that the plurality of dampers are arranged along the rotating direction. The intermediate support portion is provided with a third movement restricting portion for restricting the radially outward movement of the forward end, in the second rotating direction, of the first elastic member and the forward end, in the first rotating direction, of the second elastic member. The intermediate member has a coupling portion for coupling the plurality of intermediate support portions together.

According to the lockup mechanism of the fifteenth aspect, since the intermediate support portion is provided with the third movement restricting portion, the ends of the first and second elastic members forming the intermediate portion, in the rotating direction, of the damper are restrained from moving radially outwardly, so that the frictional resistance of the first and second elastic members with respect to other members is reduced. In particular, all the portions of the first and second elastic members forming the opposite ends and the intermediate portion, in the rotating direction, of the damper are restrained from moving radially outwardly, so that the frictional resistance of the first and second elastic members with respect to other members is significantly reduced.

According to a sixteenth aspect, the lockup mechanism of the fourteenth aspect further has such a feature that the first movement restricting portion is arranged radially outside the forward end, in the first rotating direction, of the first elastic member and the forward end, in the second rotating direction, of the second elastic member.

According to the lockup mechanism of the sixteenth aspect, the first movement restricting portion can be in contact with the outer peripheral portions of the forward end, in the first rotating direction, of the first elastic member and the forward end, in the second rotating direction, of the second elastic member, and thereby can restrict the radially outward movement of these ends. Therefore, a superior effect can be achieved by the simple structure.

According to a seventeenth aspect, the lockup mechanism of the sixteenth aspect further has such a feature that the inner peripheral surface of the first movement restricting portion can be in contact with the forward end, in the first rotating direction, of the first elastic member and the forward end, in the second rotating direction, of the second elastic member, and the inner peripheral surface of the first movement restricting portion is operable to guide radially inwardly the forward end, in the first rotating direction, of the first elastic member and the forward end, in the second rotating direction, of the second elastic member when the forward end, in the first rotating direction, of the first elastic member and the forward end, in the second rotating direction, of the second elastic member are pressed against the inner peripheral surface of the first movement restricting portion.

According to the lockup mechanism of the seventeenth aspect, when the forward end, in the first rotating direction, of the first elastic member and the forward end, in the second rotating direction, of the second elastic member are pressed against the inner peripheral surface of the first movement restricting portion, both the ends are guided radially inwardly by the inner peripheral surface thereof. Therefore, even if the first movement restricting portion does not restrict the radially outward movement of the ends of the first and second elastic members in the free state, the first movement restricting portion reliably guides the ends of the first and second elastic members radially inwardly when the first and second elastic members are compressed, so that a sufficient space can be kept between the first and second elastic members and members arranged radially outside the same. As a result, an unnecessary frictional resistance is unlikely to occur during transmission of the torsional vibration.

According to an eighteenth aspect, the lockup mechanism of the fourteenth aspect further has such a feature that the second movement restricting portion is arranged radially outside the forward end, in the first rotating direction, of the first elastic member and the forward end, in the second rotating direction, of the second elastic member.

According to the lockup mechanism of the eighteenth aspect, the second movement restricting portion can be in contact with the outer peripheral portions of the forward end, in the first rotating direction, of the first elastic member and the forward end, in the second rotating direction, of the second elastic member, and thereby can restrict the radially outward movement of these ends. Therefore, a superior effect can be achieved by the simple structure.

According to a nineteenth aspect, the lockup mechanism of the eighteenth aspect further has such a feature that the inner peripheral surface of the second movement restricting portion can be in contact with the forward end, in the first rotating direction, of the first elastic member and the forward end, in the second rotating direction, of the second elastic member, and is operable to guide radially inwardly the forward end, in the first rotating direction, of the first elastic member and the forward end, in the second rotating direction, of the second elastic member when the forward end, in the first rotating direction, of the first elastic member and the forward end, in the second rotating direction, of the second elastic member are pressed against the inner peripheral surface of the second movement restricting portion.

According to the lockup mechanism of the nineteenth aspect, when the forward end, in the first rotating direction, of the first elastic member and the forward end, in the second rotating direction, of the second elastic member are pressed against the inner peripheral surface of the second movement restricting portion, both the ends are guided radially inwardly by the inner peripheral surface thereof. Therefore, even if the second movement restricting portion does not restrict the radially outward movement of the ends of the first and second elastic members in the free state, the second movement restricting portion reliably guides the ends of the first and second elastic members radially inwardly when the first and second elastic members are compressed, so that a sufficient space can be kept between the first and second elastic members and members arranged radially outside the same. As a result, an unnecessary frictional resistance is unlikely to occur during transmission of the torsional vibration.

According to a twelfth aspect, the lockup mechanism of the fourteenth aspect further has such a feature that the output member has a cylindrical portion arranged radially outside the first and second elastic members, and the output support portion and the cylindrical portion are relatively rotatably and axially dis-engagably engaged together.

In the lockup mechanism according to the twentieth aspect, the cylindrical portion is arranged radially outside the first and second elastic members, and prevents a radially outward displacing of the elastic members. Since the output support portion and the cylindrical portion are formed of independent members, the parts increase in number but each part can have a simple structure, which allows easy working or processing of the whole structure.

According to a twenty-first aspect, the lockup mechanism of the twentieth aspect further has such a feature that the second movement restricting portion is formed of portions located near the opposite ends, in the rotating direction of the damper, of the cylindrical portion and protruding radially inwardly beyond the other portion.

In the lockup mechanism according to the twenty-first aspect, the second movement restricting portion is formed by partially deforming the cylindrical portion, and therefore can be worked and processed easily.

The foregoing and other objects, features, aspects and advantages of the present invention will become more apparent from the following detailed description, when taken in conjunction with the accompanying drawings.

DESCRIPTION OF THE PREFERRED EMBODIMENTS

First Embodiment

Figure 1:
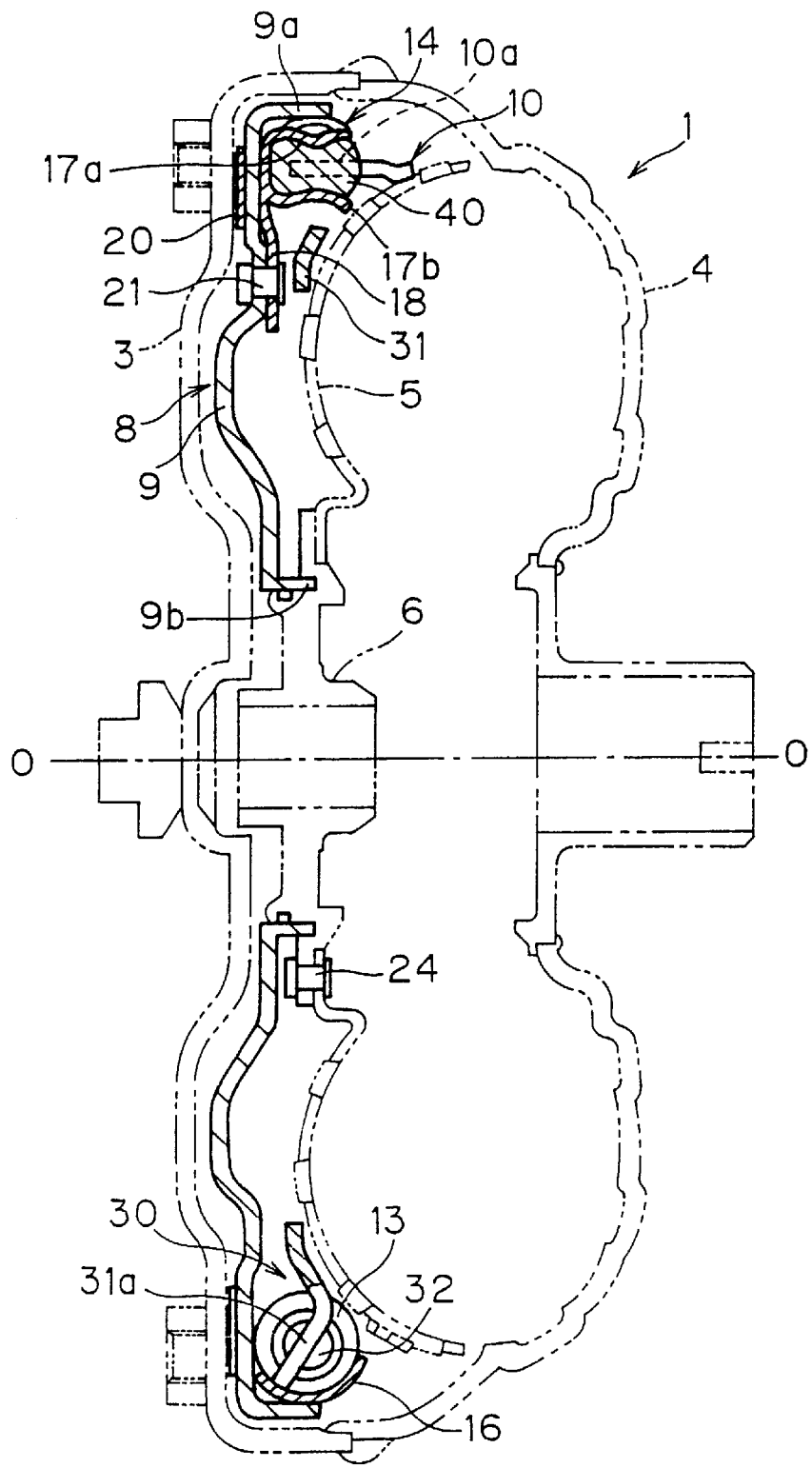
FIG. 1 is a side cross section of a lockup clutch in a torque converter in accordance with a first embodiment of the present invention.

A torque converter 1 shown in FIG. 1 includes a front cover 3, a torque converter main unit, which is formed of an impeller 4, a turbine 5 and a stator (not shown), and a lockup mechanism 8. In FIG. 1, an engine is typically disposed to the left side of FIG. 1 and a transmission on the right side of FIG. 1. Hereinafter, for the purpose of providing directional orientation, the left side of FIG. 1 will be referred to as the engine side, and the right side of FIG. 1 will be referred to as the transmission side.

The front cover 3 and a shell of the impeller 4 define a working fluid chamber filled with working fluid. The impeller 4, turbine 5 and stator (not shown) have the same structures as those in the prior art, and therefore will not be described below in detail. A shell of the turbine 5 is fixed at its inner peripheral portion to a turbine hub 6 by rivets 24. The turbine hub 6 is spline-fitted to a shaft (not shown) extending from a transmission.

The lockup mechanism 8 is provided for selectively mechanically transmitting torque from the front cover 3 to the turbine 5 and turbine hub 6, and for absorbing and damping a vibration transmitted thereto. The lockup mechanism 8 is basically formed of an input piston member 9, an output driven member 10, four elastic members, i.e., four coil springs 13, a retaining plate 14, and a coupling member 30.

The piston member 9 is operable to move toward and away (back and forth) from the front cover 3 in accordance with changes of the hydraulic pressure in the torque converter main unit in a manner well known in the art. The piston member 9 is substantially formed of a circular plate, and has cylindrical portions 9a and 9b at its outer and inner peripheries, respectively. The outer and inner cylindrical portions 9a and 9b extend toward the transmission (rightward in FIG. 1). The inner cylindrical portion 9b is supported relatively rotatably and axially movably on the outer peripheral surface of the turbine hub 6. When the clutch of the lockup mechanism is disengaged, the inner cylindrical portion 9b is in contact with the turbine hub 6, and can axially move only toward the front cover 3. A side surface of the outer peripheral portion of the piston member 9 is covered with a circular friction facing 20 which is fixed thereto and is opposed to the friction surface of the front cover 3.

Figure 2:
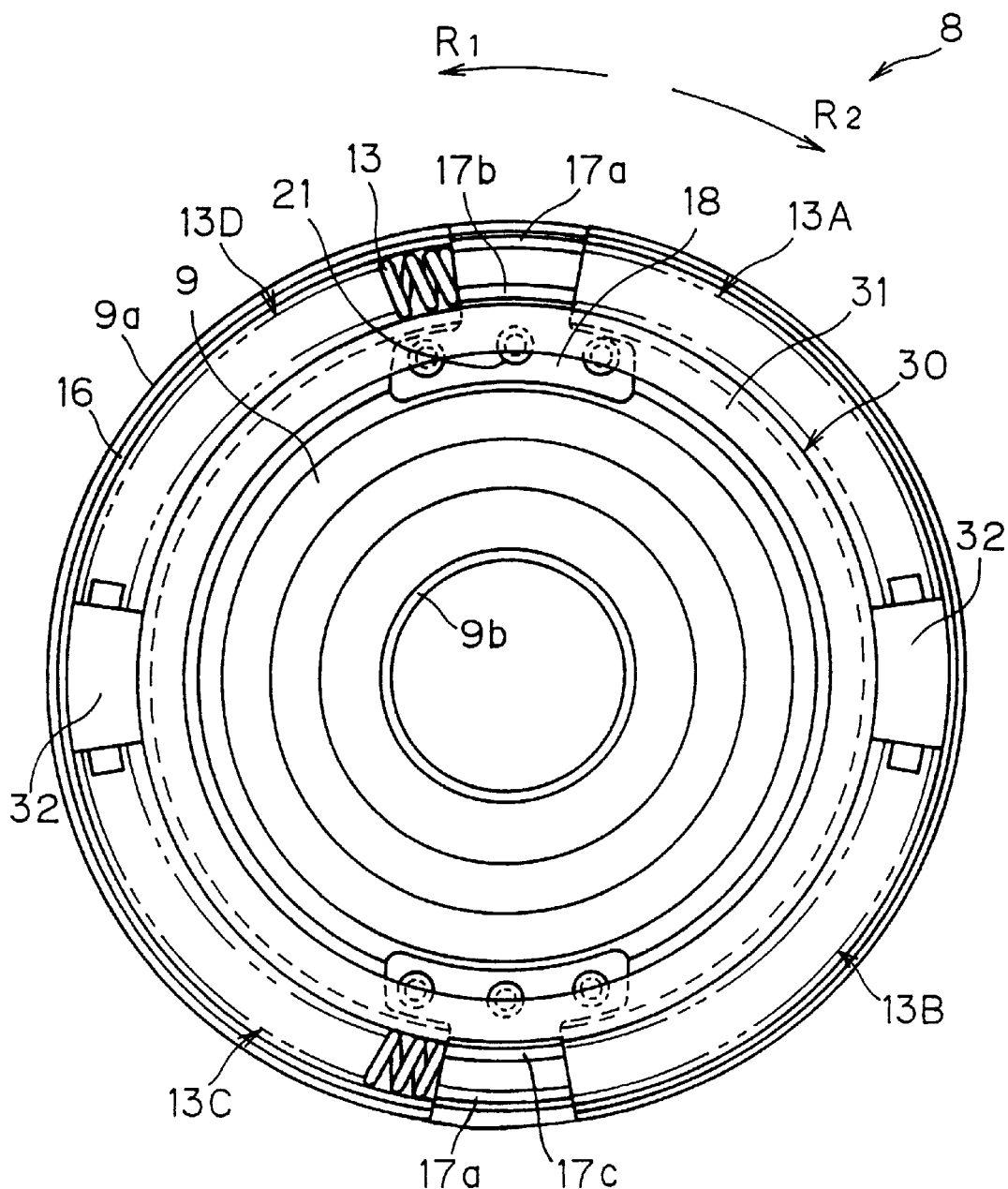
FIG. 2 is an end view of a piston member, a retaining plate, coil springs and coupling members of the lockup clutch depicted in FIG. 1.

The retaining plate 14 is provided for supporting the four coil springs 13 on the piston member 9. The retaining plate 14 is arranged radially inside the outer cylindrical portion 9a of the piston member 9. The retaining plate 14 has an outer bent portion 16 having an arc-shaped section. The outer peripheral surface of the outer bent portion 16 is in contact with the inner peripheral surface of the outer cylindrical portion 9a. As shown in FIGS. 1 and 2, the outer peripheral portion 16 is provided at circumferentially two equally space positions, diametrically opposed to each other, with circumferential support portions 17a and 17b which are bent and projected toward the inner periphery and the transmission. A fixing portion 18 extends radially inward from each set of the circumferential support portions 17a and 17b. Each fixing portion 18 extends circumferentially over a predetermined angle, and is fixed to the piston member 9 by three rivets 21.

Figure 3:
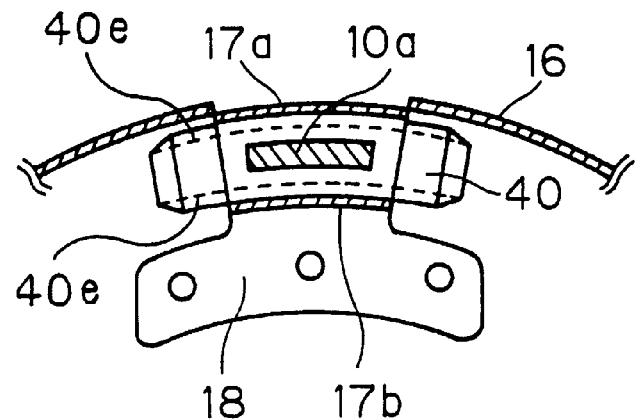
FIG. 3 is a fragmentary end view showing a portion of FIG. 2 on enlarged scale, showing details of a seat member of the lockup clutch.

The driven plate 10 is substantially formed of an annular plate, and is welded to the outer peripheral portion of the shell of the turbine 5. Two support portions 10a protrude toward the engine side from the driven member 10. Each support portion 10a extends between the circumferential support portions 17a and 17b of the retaining plate 14. A seat member 40 is attached to the support portion 10a, as shown in FIG. 3. The seat member 40 is slidable between the circumferential support portions 17a and 17b.

Figure 4:
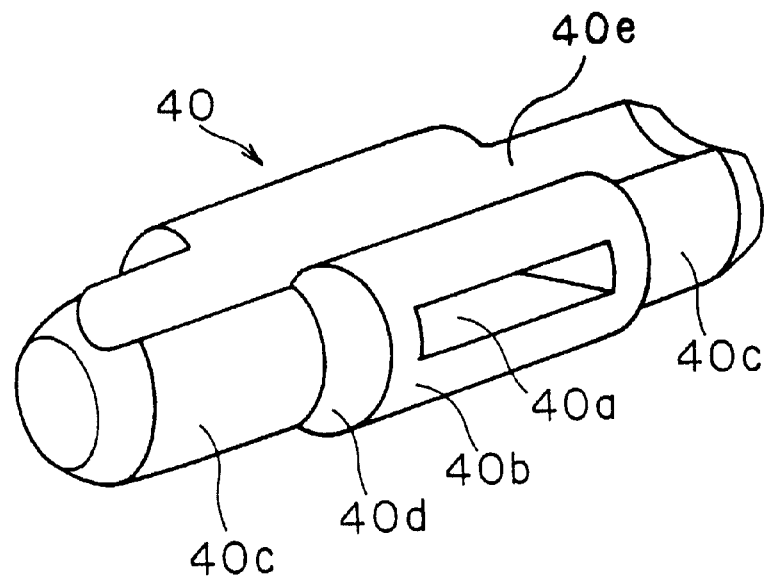
FIG. 4 is a perspective view of the seat member depicted in FIG. 3.

The seat member 40 has radially outer and inner peripheral surfaces 40e which are complementary in shape to circumferential support portions 17a and 17b, respectively, as shown in FIG. 4 and is circumferentially movably fitted between the circumferential support portions 17a and 17b as shown in FIG. 3. The seat member 40 is formed with a fitting portion 40b having an opening 40a, into which the support portion 10a of the driven member 10 is fitted, loose-fit portions 40c which are formed at the circumferentially opposite ends of the fitting portion 40b and are loosely fitted into the circumferential ends of the coil springs 13, respectively, and supporting surfaces 40d which are in contact with the surfaces of the circumferential ends of the coil springs 13, respectively. Each loose-fit portion 40c has a tapered or converging form for easy fitting into the coil spring 13. When the loose-fit portion 40c is fitted into the end of the coil spring 13, it restricts radially outward movement of the end of the coil spring 13. A whole configuration of the seat member 40 is curved along the circumferentially extending various members, as is shown in FIG. 3.

Each coil spring 13 is operable to transmit torque in the lockup mechanism 8, and is also operable to absorb or damp minute torsional vibration caused by variation in rotation of the engine and vibration due to a shock caused by the engagement operation of the clutch. The coil spring 13 elastically couples, in the rotating direction of the torque converter, the piston member 9 and the driven member 10 together through the retaining plate 14. As shown in FIG. 2, first and second coil springs 13A and 13B are arranged in one of the arc-shaped spaces defined between two sets of the diametrically opposed circumferential support portions 17a and 17b and the supporting surfaces 40d. Third and fourth coil springs 13C and 13D are arranged in the other of the arc-shaped spaces defined between the diametrically opposed circumferential support portions 17a and 17b and the supporting surfaces 40d. The third and fourth coil springs 13C and 13D have the same structures as the first and second coil springs 13A and 13B, and therefore will not be described below.

The first and second coil springs 13A and 13B are arranged in series as shown in FIG. 2, and a spring intermediate seat portion 32 of the coupling member 30 is interposed between them. The combination of the first and second coil springs 13A and 13B exhibits characteristics such as a large maximum torsion angle (displacement angle) and low rigidity.

The coupling member 30 is provided for radially coupling the coil springs 13 together and thereby restricting a radially outward movement of the coil springs 13. The coupling member 30 is formed of an annular plate 31 and spring intermediate seat portions 32 provided on the annular plate 31.

The annular plate 31 is relatively rotatably arranged radially inside the coil springs 13 and axially between the retaining plate 14 and the turbine 5. The annular plate 31 is provided at diametrically opposed two portions thereof with projections 31a (see FIG. 1) protruding radially outward. One of the projections 31a extends between the first and second coil springs 13A and 13B, and the other extends between the third and fourth coil springs 13C and 13D.

The spring intermediate seat portion 32 is fixed to the projection 31a for coupling in series the first and second coil springs 13A and 13B together and restricting the radially outward movement of the ends of these coil springs 13A and 13B near the spring intermediate seat portion 32. In this manner, the ends of the first and second coil springs 13A and 13B near the spring intermediate seat portion 32 are radially coupled together by the coupling member 30, and the ends of the third and fourth coil springs 13C and 13D near the spring intermediate seat portion 32 are also radially coupled together the coupling member 30.

Thus, the coupled portions of the coil springs 13 are restrained from radially outward movement.

Operation of the first embodiment is described below.

When the lockup mechanism 8 is in a disengaged state and the working fluid between the front cover 3 and the piston member 9 is drained, the piston member 9 moves toward the front cover 3 so that the friction facing 20 comes into close contact with the friction surface of the front cover 3, thus moving into an engagement state. Thereby, the torque of the front cover 3 is transmitted to the piston member 9, and is further transmitted to the turbine 5 via the retaining plate 14, coil springs 13 and drive member 10. The torque thus transmitted is output from the turbine hub 6 to the shaft (not shown) extending from the transmission. The direction of the input torque, i.e., the rotating direction of the torque converter 1 is indicated by R1 in FIG. 2.

When minute torsional vibrations are transmitted to the front cover 3 with the lockup mechanism in the engagement state, a relative rotation cyclically occurs between the piston member 9 and the driven member 10 so that the coil springs 13 circumferentially expand and contract. In this operation, the minute torsional vibrations are effectively absorbed owing to the characteristics of the coil springs 13 exhibiting the low rigidity and the large maximum torsional angle. The compressed coil spring 13 tends to protrude radially outward, and also tends to move radially outward due to a centrifugal force. However, the coil springs 13 coupled together (i.e., the first and second coil springs 13A and 13B as well as the third and fourth coil springs 13C and 13D) are carried at their coupled portions by the spring intermediate seat portions 32 and are also supported at their ends by the seat members 40 so that a radially outward movement of them is suppressed. Consequently, frictional sliding is suppressed between the coil springs 13 and the outer bent portion 16. Thus, the frictional resistance occurring between the coil springs 13 and the outer bent portion 16 is small, and the coil springs 13 can effectively absorb the minute torsional vibration. When the coil springs 13 are in the compressed state, ends of the coil springs 13 coupled together by the spring intermediate seat portion 32 are supported by the loose-fit portion 40c and the support surface 40d on the driven member 10. The other end of the springs 13 are carried by the circumferential support portions 17a and 17b on the piston member 9, and are in contact with the outer bent portion 16. The circumferential support portions 17a and 17b supporting the other end are integral with the outer bent portion 16 so that sliding hardly occurs between the other ends of the coil springs 13 and the outer bent portion 16.

It should be appreciated that as the coil springs 13 are compressed, the seat members 40 slide circumferentially with respect to the 17 and may move circumferentially away from the circumferential support portions 17a and 17b. However, the shape of the outer and inner peripheral surfaces 40e assists in guiding the seat members 40 back in between the circumferential support portions 17a and 17b.

Second Embodiment

Figure 6:
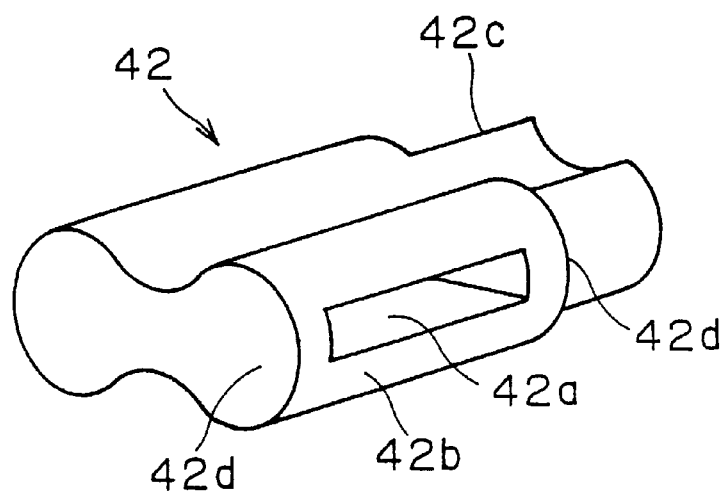
FIG. 6 is a perspective view of the seat member depicted in FIG. 5.

A second embodiment uses a seat member 42 shown in FIG. 6 instead of the seat member 40 employed in the first embodiment. Structures of the torque converter other than features relating to the seat member 42, are the same as those described above with respect to the first embodiment.

Figure 5:
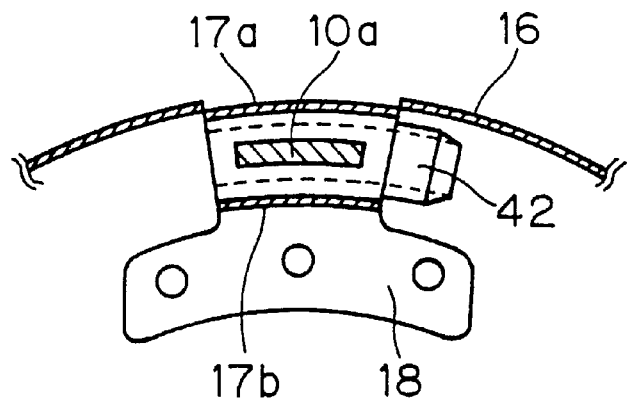
FIG. 5 is a fragmentary view similar to FIG. 3, showing details of a seat member in accordance with a second embodiment of the present invention.

The seat member 42 has outer and inner peripheral surfaces which are complementary in shape to the circumferential support portions 17a and 17b as shown in FIG. 6, and is circumferentially movably arranged between the circumferential support portions 17a and 17b. The seat member 42 is formed with a fitting portion 42b having an opening 42a fitted to the support portion 10a of the driven member 10, a loose-fit portion 42c which is formed at one of circumferential ends of the fitting portion 42b and can be loosely fitted into the end of the coil spring 13, and a support surface 42d which can be in contact with the end surface (i.e., the surface at the circumferential end) of the coil spring 13. The loose-fit portion 42c is located at the rear of the fitting portion 42b in the rotating direction of the torque converter 1 indicated by R1 in FIG. 2. The end of the loose-fit portion 42c has a tapered or converging form for easy fitting into the coil spring 13. The loose-fit portion 42c is fitted into the forward end, in the rotating direction of the torque converter 1, of the coil springs 13 coupled together by the spring intermediate seat portion 32 so that the seat member 42 restricts the radially outward movement of the coupled coil springs 13. The seat member 42 has a curved form as a whole complementary to the forms of the circumferentially extending members (see FIG. 5).

Operation of the second embodiment is described below.

The torque is transmitted from the front cover 3 to the shaft (not shown) extending from the transmission in the same manner as the first embodiment.

When the lockup clutch is in the engagement state, the torque converter 1 rotates in the direction indicated by R1 in FIG. 2 so that the coil springs 13 coupled by the spring intermediate seat portion 32 are compressed between the support surface 42d of the driven plate 10, which supports the forward end, in the rotating direction of the torque converter 1, of the springs 13, and the circumferential support portions 17a and 17b of the piston member 9, which support the rear end of the springs 13. When minute torsional vibrations enter the front cover 3 while the coil springs 13 is compressed in the above manner, the piston member 9 and the driven member 10 cyclically rotate relatively to each other, and the coil springs 13 circumferentially expand and contract. In this operation, the compressed coil springs 13 tend to protrude radially outward, and are also forced radially outward by the centrifugal force. However, the coupled coil springs 13 have the coupled portions supported by the spring intermediate seat portion 32 as well as one end supported by the loose-fit portion 42c on the driven member 10 so that the radially outward movement of them is suppressed. As a result, frictional sliding is unlikely to occur between the coil spring 13 and the outer bent portion 16. Thus, a frictional resistance occurring between the coil springs 13 and the outer bent portion 16 is small so that the coil springs 13 can effectively absorb the minute torsional vibration. The other end of the coil springs 13 which are coupled together by the spring intermediate seat portion 32 is supported by the circumferential support portions 17a and 17b on the piston member 9, and is not supported by a portion or member restricting the radially outward movement so that the other end comes into contact with the outer bent portion 16. However, the circumferential support portions 17a and 17b which support the other end are integral with the outer bent portion 16 so that a sliding hardly occurs between the other end of the coil springs 13 and the outer bent portion 16.

When the lockup clutch is being engaged or disengaged, a relatively large torsional vibration occurs due to a shock or the like. In this operation, the piston member 9 and the driven member 10 repeat large relative rotations in both the directions so that the vibration is damped. When the driven member 10 rotates relatively to the piston member 9 in the direction R2 opposite to the rotating direction of the torque converter 1, the loose-fit portion 42c restricts the radially outward movement of the forward end, in the rotating direction (R1) of the torque converter 1, of the coupled coil springs 13 so that the frictional sliding is suppressed between the forward end and the outer bent portion 16. Conversely, when the driven member 10 is rotating relatively to the piston member 9 in the same direction (R1 in FIG. 2) as the rotating direction of the torque converter 1, the rear end, in the rotating direction R1 of the torque converter 1, of the coupled coil springs 13 frictionally slides on the outer bent portion 16 because the radially outer movement of this rear end is not restricted. Owing to the resistance, which is produced by the frictional sliding between the rear end, in the rotating direction R1 of the torque converter 1, of the coupled coil springs 13 and the outer bent portion 16, it is possible to damp effectively the torsional vibration which occurs during the engaging and disengaging operations of the lockup mechanism.

Third Embodiment

Figure 7:
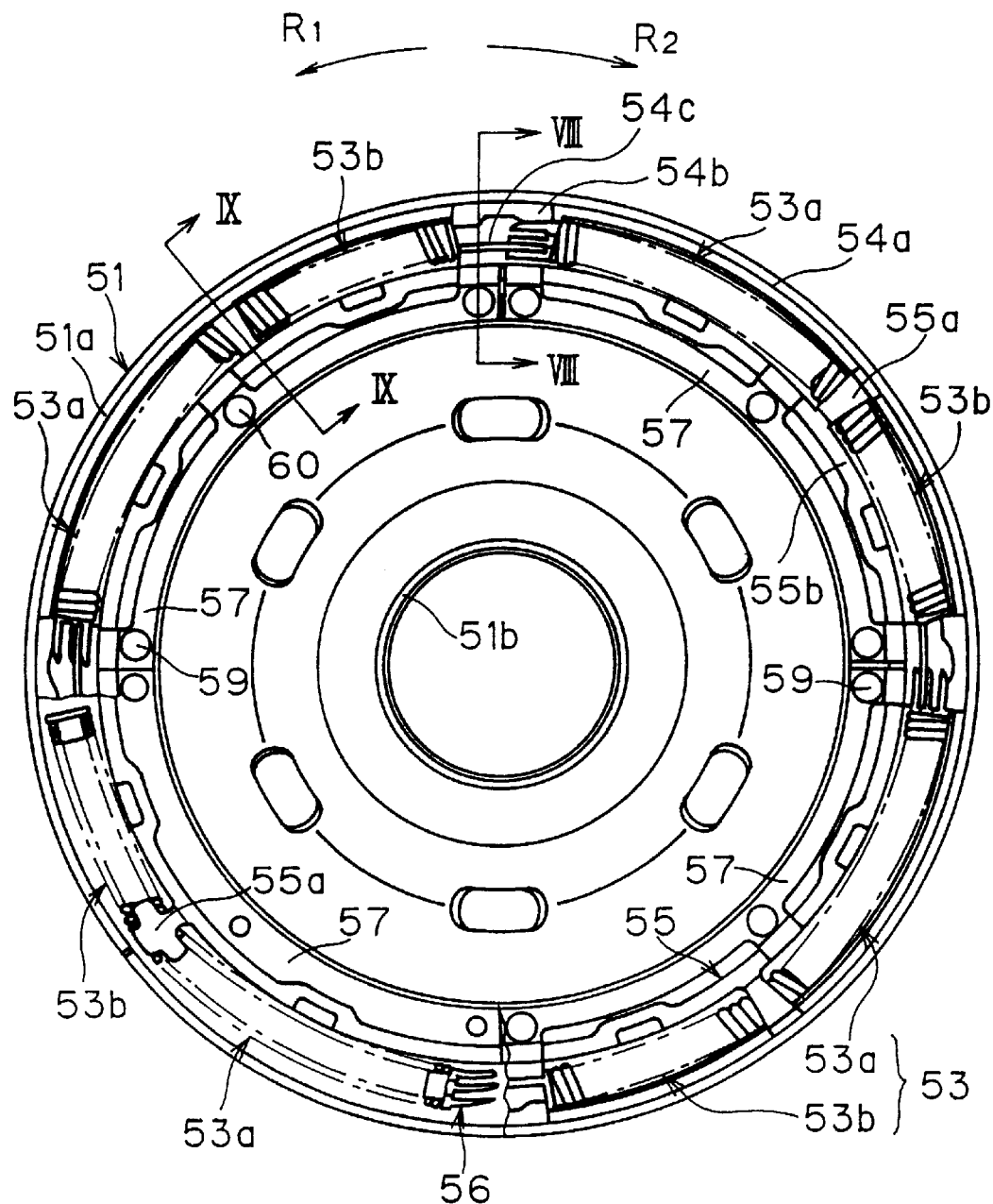
FIG. 7 is an end view similar to FIG. 2, showing a piston member, a retaining plate, coil springs and coupling members in accordance with a third embodiment of the present invention.
Figure 8:
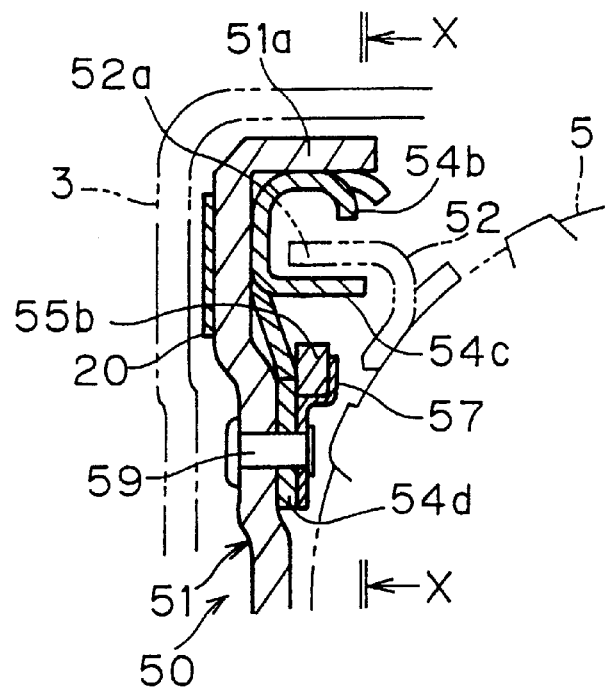
FIG. 8 is fragmentary a cross section view taken along line VIII—VIII in FIG. 7.
Figure 9:
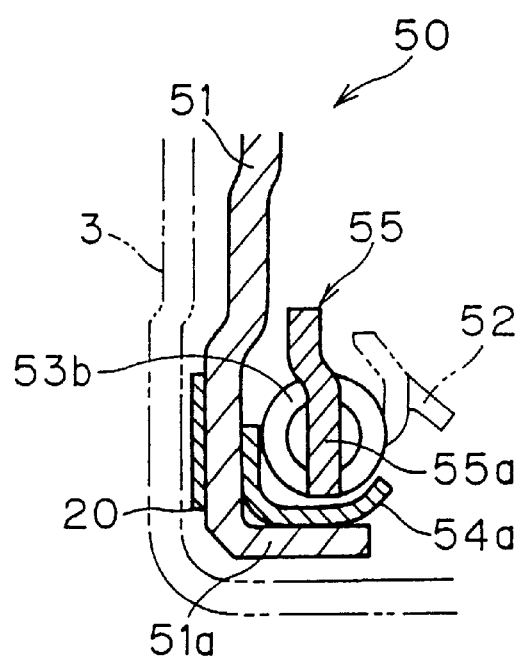
FIG. 9 is a fragmentary cross section view taken along line IX—IX in FIG. 7.

A lockup mechanism 50 of a torque converter of a third embodiment of the invention shown in FIGS. 7 to 12 is provided for mechanically transmitting a torque from the front cover 3 to the turbine 5 while absorbing and damping a transmitted vibration. The lockup mechanism 50 is basically formed of an input piston member 51, an output driven member 52, four elastic members, i.e., coil springs 53 each including a set of large and small coil springs 53a and 53b, a retaining member, i.e., a retaining plate 54, a coupling member 55 and seat members 56. FIG. 7 is a plan showing the lockup mechanism 50 with the driven member 52 not shown for greater clarity, and FIGS. 8 and 9 show fragmentary cross sections of the lockup mechanism 50.

The piston member 51 is operable to move toward or away from the front cover 3 in accordance with selective changes in the hydraulic pressure in the torque converter main unit in a manner know in the art. The piston member 51 is substantially formed of a circular plate, and has cylindrical portions 51a and 51b at its outer and inner peripheries. The outer and inner cylindrical portions 51a and 51b extend toward the transmission (rightward in FIGS. 8 and 9). The inner cylindrical portion 51b is carried relatively rotatably and axially movably on the outer peripheral surface of the turbine hub (not shown). A side surface of the outer peripheral portion of the piston member 51 is covered with the circular friction facing 20 which is fixed thereto and is opposed to a corresponding friction surface of the front cover 3.

The retaining plate 54 is provided for holding the four sets of coil springs 53 on the piston member 51. The retaining plate 54 is arranged radially inside the outer cylindrical portion 51a of the piston member 51. The retaining plate 54 has an outer bent portion 54a having an arc-shaped section. The outer peripheral surface of the outer bent portion 54a is in contact with the inner peripheral surface of the outer cylindrical portion 51a. The outer peripheral portion 54a is provided at circumferentially equally spaced four positions with circumferential support portions 54b and 54c which are bent and projected toward the inner periphery and the transmission side. A fixing portion 54d extends radially inward from each set of the circumferential support portions 54a and 54b. Each fixing portion 54d is fixed to the piston member 51 by rivets 59.

Figure 10:
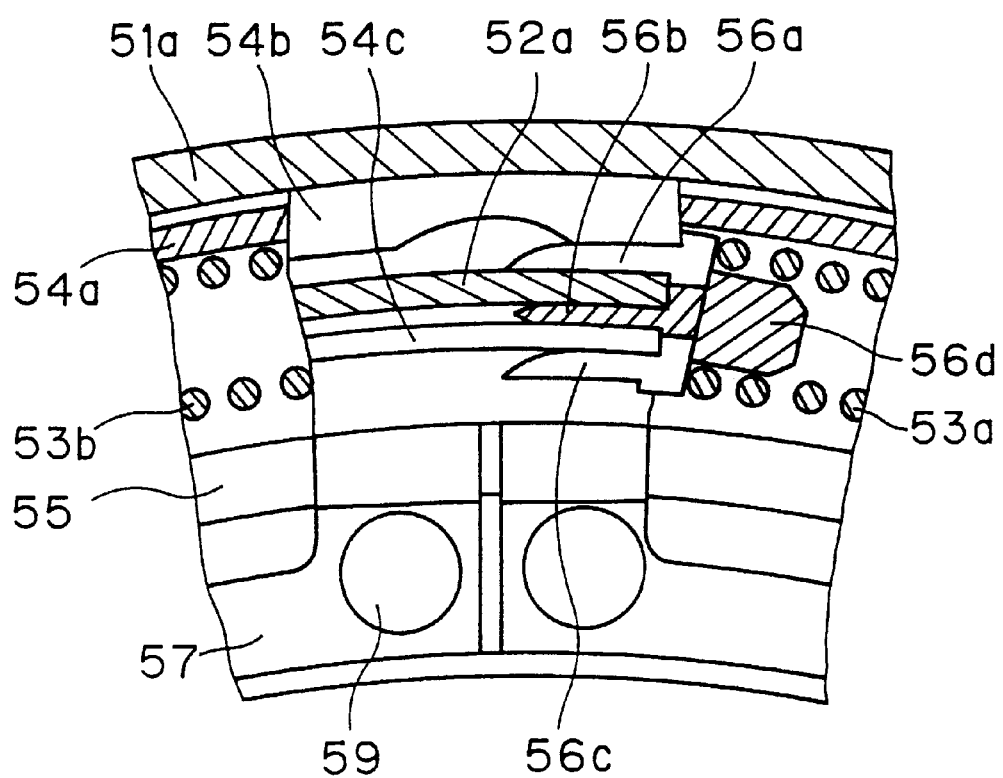
FIG. 10 is a fragmentary cross section view, on an enlarged scale, showing details of a seat member in accordance with the third embodiment depicted in FIGS. 7, 8 and 9.

The driven plate 52 is substantially formed of an annular plate, and is welded to the outer peripheral portion of the shell of the turbine 5. Four support portions 52a protrude toward the engine from the driven member 52 as shown in FIGS. 8 and 10. Each support portion 52a is arranged between the circumferential support portions 54b and 54c of the retaining plate 54.

Figure 11:
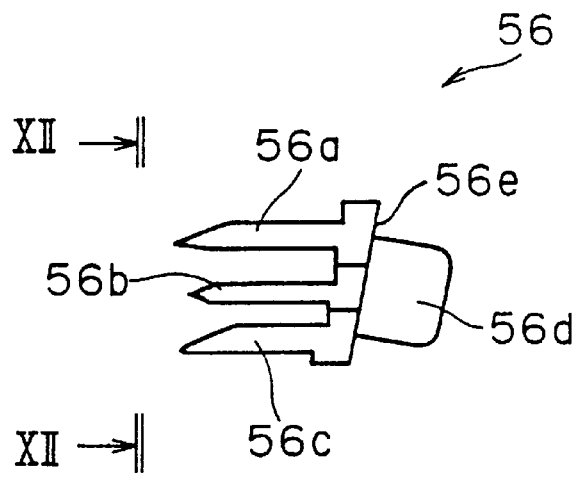
FIG. 11 is a side view of the seat member depicted in FIG. 10, shown removed from the lockup clutch.
Figure 12:
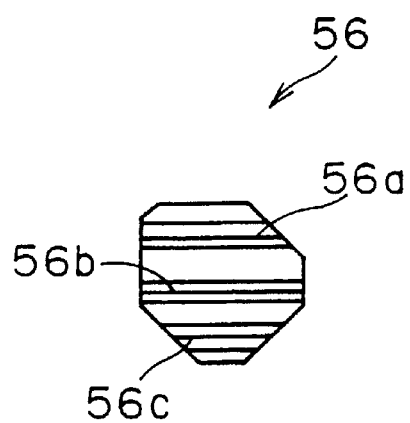
FIG. 12 is an elevation of the seat member depicted in FIG. 11, viewed along line XII—XII in FIG. 11.

The seat member 56 has three claws, i.e., radially outer, middle and inner claws 56a, 56b and 56c as shown in FIGS. 11 and 12, and also has a fitting portion 56d, which extends into the large coil spring 53a, and a supporting surface 56e which is in contact with the circumferential end surface of the large coil spring 53a and supports the large coil spring 53a. As shown in FIG. 10, the seat member 56 is engageable with the support portion 52a of the driven member 52 and the circumferential support portions 54b and 54c of the retaining plate 54, and is fitted to the large coil spring 53a. More specifically, the support portion 52a is fitted into a groove between the outer and middle claws 56a and 56b, and the circumferential support portion 54c is fitted into a groove between the middle and inner claws 56b and 56c.

The radially outward movement of the seat member 56 and the end of the large coil spring 53a fitted to the seat member 56 is restricted by the support portion 52a when the support portion 52a is fitted into the groove between the outer and middle claws 56a and 56b, and is also restricted by the circumferential support portions 54b and 54c when the circumferential support portion 54c is fitted into the groove between the middle and inner claws 56b and 56c. The fitting portion 56d and supporting surface 56e are inclined at an angle as shown in FIG. 10 and 11 for better engagement with the coil spring 53a. The tip ends of the three claws 56a, 56b and 56c, which contact the support portion 52a and the circumferential support portions 54b and 54c, have inclined surfaces for easy fitting of the support portion 52a and the circumferential support portions 54b and 54c into the grooves formed between the claws 56a, 56b and 56c. The seat member 56 has a configuration allowing easy manufacturing as shown in FIG. 11, and is not a resin molded product but a metal product. It should be understood, that the seat member 56 moves in and out of engagement with the support portion 52a in response to compression and expansion of the coil springs.

The coil springs 53 are operable to transmit a torque in the lockup mechanism 8, and is also operable to absorb or damp a minute torsional vibration caused by variation in rotation of the engine and a vibration due to a shock caused by the engaging operation of the clutch. In this embodiment, since the coil spring 53 is formed of the two kinds of, i.e., large and small coil springs 53a and 53b, the damper characteristics obtained thereby can have two stages. The coil spring 53 elastically couples the piston member 51 and the driven member 52 together in the rotating direction through the retaining plate 54. The large and small coil springs 53a and 53b are arranged in series with an intermediate seat portion 55a of the coupling member 55 therebetween. The coupling member 55 is described below. The seat member 56 is attached to the forward end, in the torque converter rotating direction indicated by R1 in FIG. 7, of the large coil spring 53a.

The coupling member 55 is provided for radially coupling the coupled portions of the four sets of coil springs 53 and thereby restricting the radially outward movement of the coupled portions. The coupling member 55 is formed of an annular plate 55b and intermediate seat portions 55a which protrude radially outward from circumferentially spaced four positions of the annular plate 55b. The annular plate 55b is located radially inside the coil springs 53, and is arranged axially between the retaining plate 54 and the turbine 5 for relative rotation with respect to them. The annular plate 55b is rotatably pressed by arc-shaped pressing plates 57 for restricting the axial movement thereof as shown in FIGS. 7 and 8. The pushing plates 57 are four in number, and are fixed at their inner peripheral portions to the piston member 51 by rivets 60 and the aforementioned rivets 59. The intermediate seat portion 55a couples the large and small coil springs 53a and 53b in series, and restricts the radially outward movement of the coupled portions of these coil springs 53a and 53b.

Operation of the embodiment shown in FIGS. 7–12 is described below.

During the engaged state of the lockup clutch, the torque converter rotates in the direction R1 in FIG. 7 so that the coil spring 53 is compressed between the support surface 56e of the seat member 56, which is fitted to the support portion 52a of the driven member 52 and supports the forward end, in the rotating direction of the torque converter, of the large coil spring 53a, and the circumferential support portions 54b and 54c of the retaining plate 54, which are fixed to the piston member 51 and support the rear end of the small coil spring 53b. When a minute torsional vibration is supplied to the front cover 3 in this state, relative rotation cyclically occurs between the piston member 51 and the driven member 52 so that the coil springs 13 are circumferentially compressed and expanded. In this operation, the compressed coil springs 13 tend to protrude radially outward, and are also forced radially outward by the centrifugal force. However, the coil spring 53 has the coupled portion, which is supported by the intermediate seat portion 55a of the coupling member 55. Also, the end of the large coil spring 53a at the forward position in the rotating direction of the torque converter is supported by the support portion 52a of the driven member 52 through the middle claw 56b of the seat member 56. Therefore, the radially outward movement of the spring 53 is suppressed. As a result, frictional sliding is unlikely to occur between the coil spring 53 and the outer bent portion 54a. Thus, a frictional resistance occurring between the coil spring 53 and the outer bent portion 54a is small so that the coil spring 53 can effectively absorb the minute torsional vibration.

When the lockup clutch is being engaged or disengaged, a relatively large torsional vibration occurs due to a shock. In this operation, the piston member 51 and the driven member 52 repeat large relative rotations in the rotating and reverse directions, whereby the vibration is damped. When the driven member 52 rotates relative to the piston member 51 in the direction (R2 in FIG. 7) opposite to the rotating direction of the torque converter, the radially outward movement of the coil spring 53 is suppressed, because the forward end, in the torque converter rotating direction (R1), of the large coil spring 53a of the coil spring 53 is supported by the support portion 52a of the driven member 52 through the middle claw 56b of the seat member 56. Thus, the frictional sliding is suppressed with respect to the outer bent portion 54a. Conversely, when the driven member 52 is rotating relatively to the piston member 51 in the same direction (R1 in FIG. 2) as the rotating direction of the torque converter, the rear end, in the rotating direction R1 of the torque converter 1, of the small coil spring 53b of the coil spring 53 frictionally slides on the outer bent portion 54a because the radially outer movement of this end is not restricted. Owing to the resistance, which is produced by the frictional sliding between the rear end, in the rotating direction R1 of the torque converter, of the coil spring 53 and the outer bent portion 54a, it is possible to damp effectively the torsional vibration which occurs during the engaging and disengaging operations.

In the third embodiment, the seat member 56 is attached only to the forward end, in the rotating direction (R1 in FIG. 7) of the torque converter, of the large coil spring 53a. However, if it is intended to suppress the frictional resistance during the relative rotation in both the relative rotation directions between the piston member 51 and the driven member 52 for changing the damper characteristics, another set of seat members 56 may be attached to the rear end, in the rotating direction (R1 in FIG. 7) of the torque converter, of the small coil spring 53b.

Fourth Embodiment

Figure 13:
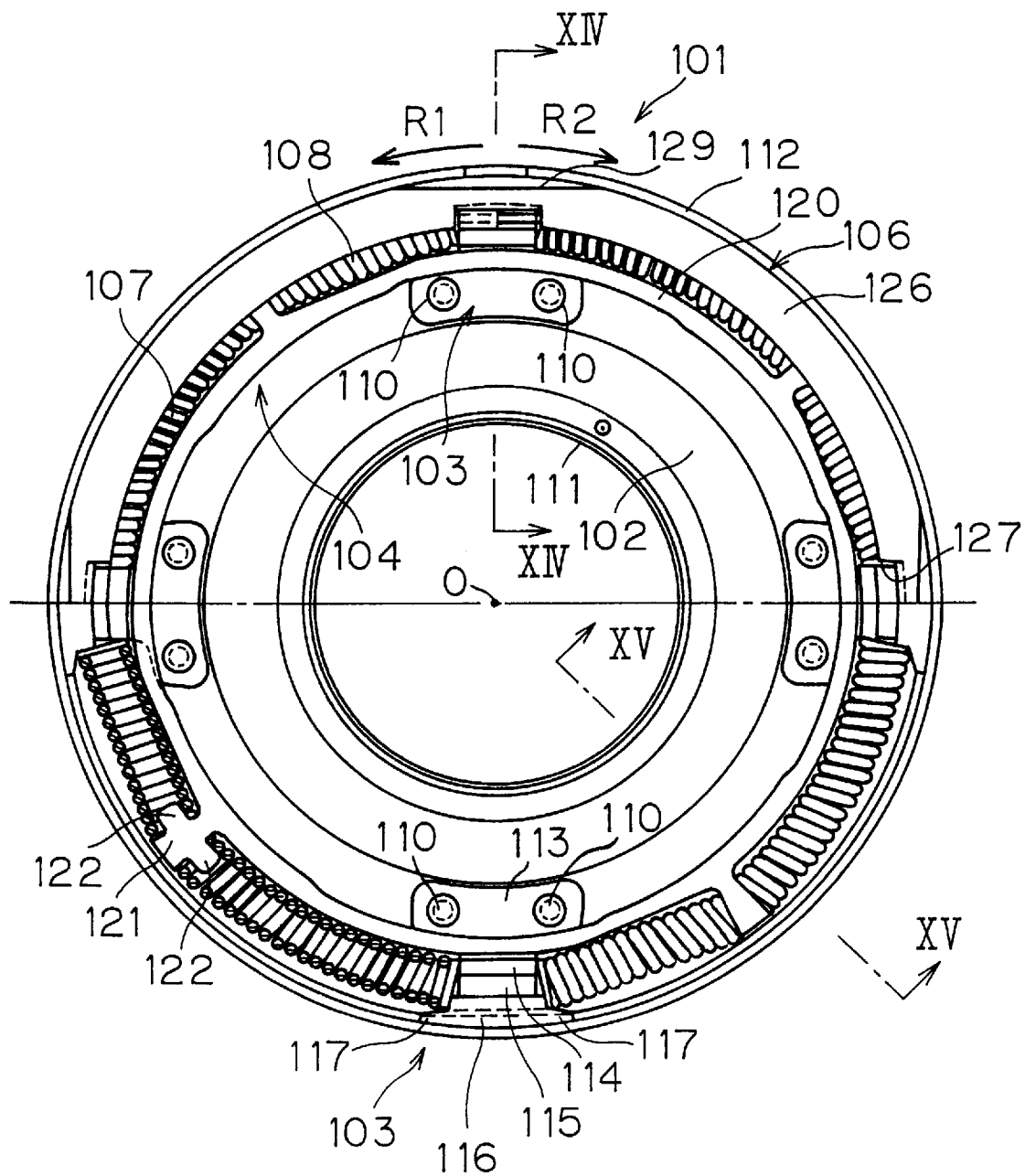
FIG. 13 is a part elevation, part cutaway, part cross section end view of a lockup mechanism of a torque converter in accordance with a fourth embodiment of the present invention.
Figure 14:
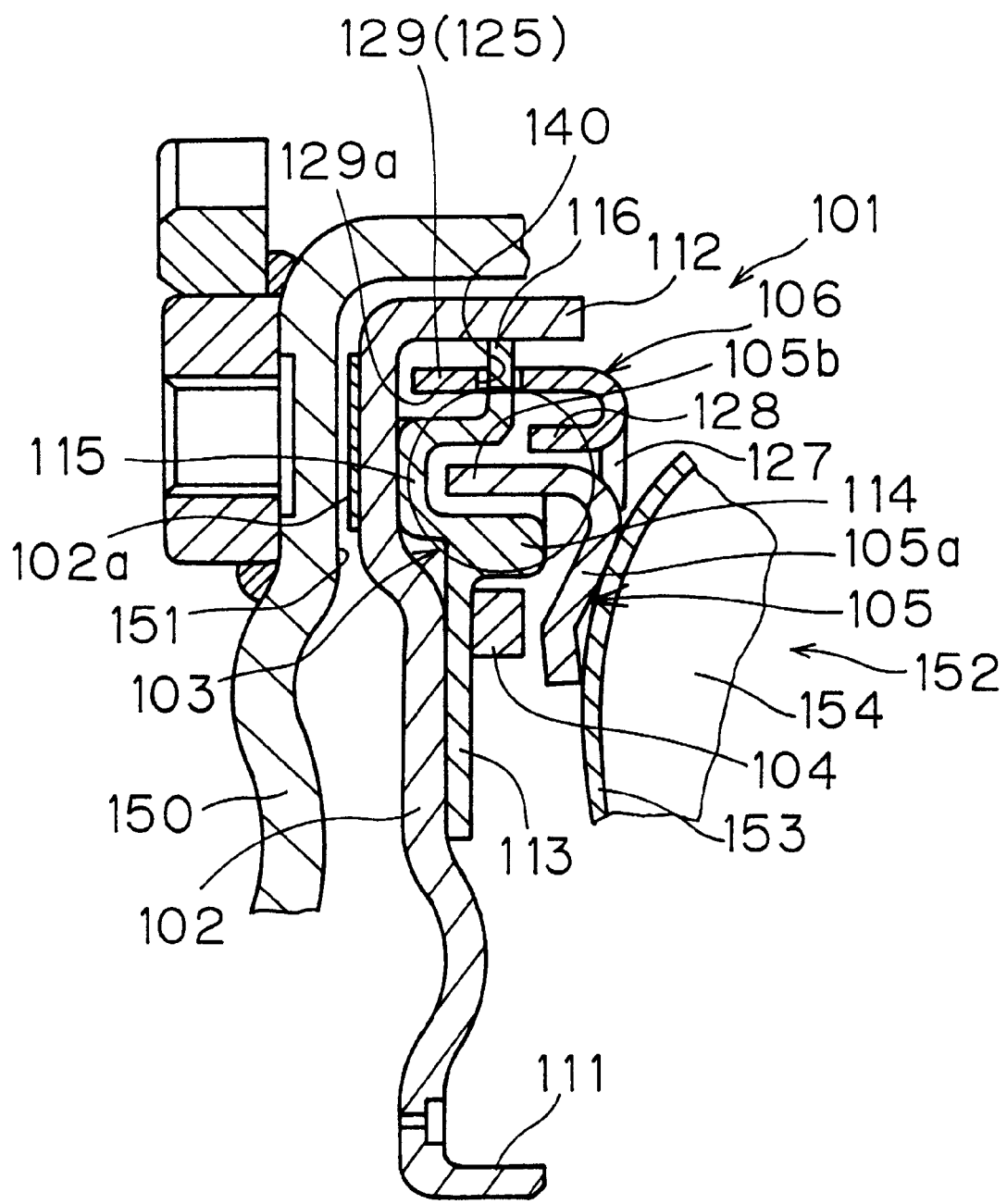
FIG. 14 is a fragmentary, cross section taken along line XIV—XIV in FIG. 13.
Figure 15:
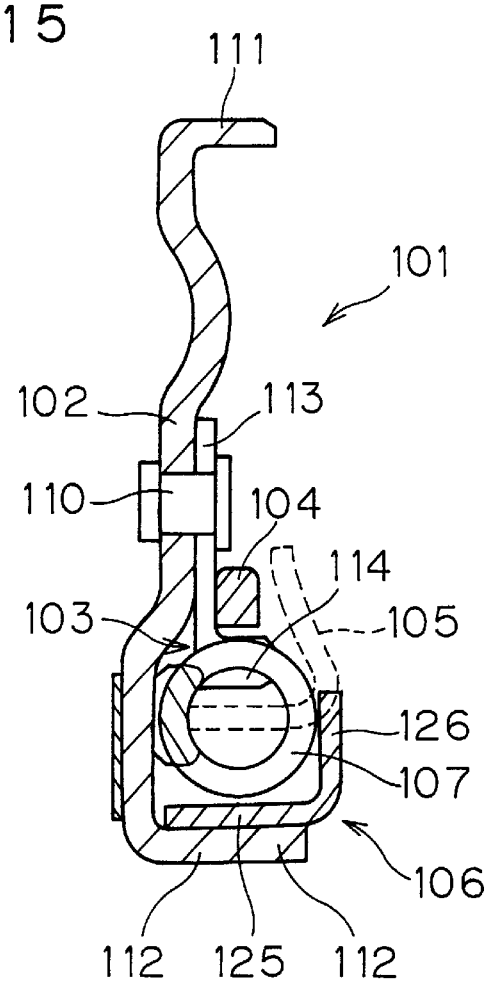
FIG. 15 is a cross section taken along line XV—XV in FIG. 13.

FIGS. 13 to 15 show a lockup mechanism 101 of a torque converter of a fourth embodiment of the invention. An engine (not shown) is arranged at the left side of FIG. 14, and a transmission (not shown) is arranged at the right side of FIG. 14. In FIG. 13, a first rotating direction R1 is a positive rotating direction of the engine, and a second rotating direction R2 is a negative or reverse rotating direction thereof.

FIG. 14 shows a front cover 150 (input rotary member) and a turbine 152 (output rotary member) of the torque converter. The front cover 150 is a circular member coupled to the crank shaft of the engine, and defines together with an impeller (not shown) a working fluid chamber of the torque converter. A flat annular friction surface 151 is formed at the inner surface of the outer peripheral portion of the front cover 150. The turbine 152 is a vane wheel axially opposed to the impeller (not shown), and is basically formed of a turbine shell 153 and a plurality of turbine blades 154 fixed to the turbine shell 153. The inner peripheral portion of the turbine shell 153 is coupled to a main drive shaft (not shown) of the transmission through the turbine hub.

The lockup mechanism 101 is provided for mechanically transmitting the torque from the front cover 150 to the turbine 152 while absorbing and damping the torsional vibration transmitted thereto. The lockup mechanism 101 has a clutch function and a damper function. The lockup mechanism 101 is arranged in a space between the front cover 150 and the turbine 152 as shown in FIG. 14.

The lockup mechanism 101 is basically formed of an input member including a piston 102, an output member including a driven plate 105, and a damper operating between the input and output members.

The input member is formed of the piston 102 and drive plates 103. The piston 102 is a clutch member which can be moved toward or away from the front cover 150 by controlling hydraulic pressure in the torque converter main unit. The piston 102 is a circular member, and has outer and inner projections 111 and 112 at its radially outer and inner portions, respectively. The inner and outer projections 111 and 112 have cylindrical forms and protrude toward the transmission. The inner projection 111 is relatively rotatably and axially movably supported on the outer peripheral surface of the turbine hub (not shown). A side surface of the outer peripheral portion of the piston 102 opposed to the engine is covered with a circular friction facing 102a fixed thereto and opposed to the friction surface 151 of the front cover 150.

Figure 16:
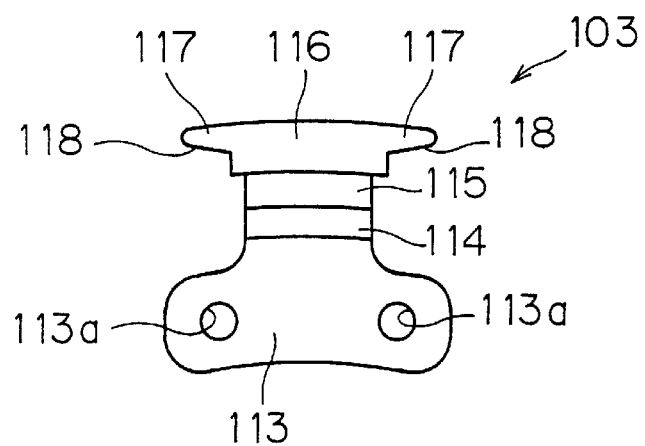
FIG. 16 is an elevation of a drive plate in accordance with the fourth embodiment of the present invention depicted in FIGS. 13, 14 and 15, showing the drive plate removed from the lockup clutch.
Figure 17:
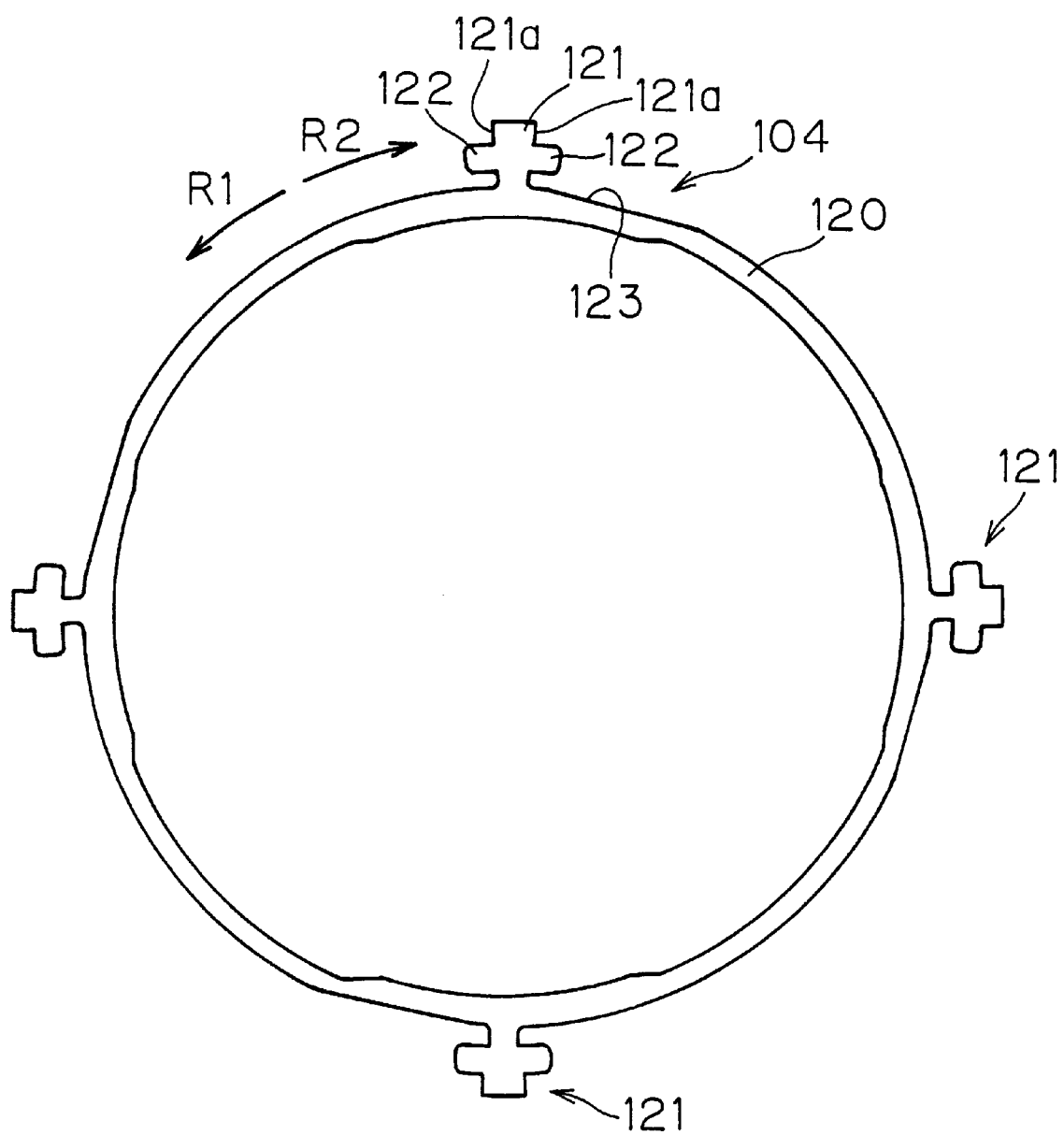
FIG. 17 is an elevation of an intermediate plate in accordance with the fourth embodiment of the present invention depicted in FIGS. 13, 14 and 15, showing the intermediate plate removed from the lockup clutch.

The drive plates 103 are fixed to the piston 102, and are provided for supporting, in the rotating direction, dampers formed of first and second coil springs 107 and 108. The drive plates 103 are arranged beside the outer peripheral portion of the piston 102 and radially inside the outer cylindrical portion 112, and are located at circumferentially equally spaced four positions. As shown in FIG. 16, each drive plate 103 is formed of a fixing portion 113 extending in the rotating direction, a radially inner engagement portion 114 extending from the outer periphery of the fixing portion 113 toward the transmission, a concavity 115 located radially outside the inner engagement portion 114 and opened toward the transmission, and a radially outer engagement portion 116 located radially outside the concavity 115. The inner engagement portion 114, concavity 115 and outer engagement portion 116 form input support portions which can be in contact with the radially inner, middle and outer portions of the first and second coil springs 107 and 108, respectively. The fixing portion 113 is provided with apertures 113a for rivets 110. The drive plate 103 is rigidly fixed to the piston 102 by rivets 110 and functions as a member at the input side. Since the input support portions support a plurality of portions at radially different positions of the ends of the first and second coil springs 107 and 108, the first and second coil springs are supported stably. The outer peripheral surface of the outer engagement portion 116 is in contact with the inner peripheral surface of the outer projection 112 of the piston 102. This facilitates positioning of the drive plate 103, and suppresses the deformation of the drive plate 103 in the radially outward direction.

The drive plate 103 is provided at circumferentially opposite sides of the outer engagement portion 116 with first movement restricting portions 117 which are projections extending in the rotating direction. The first movement restricting portions 117 support the opposite ends of the first and second coil springs 107 and 108, which are described below, and thereby restrict their radially outward movement. The first movement restricting portion 117 has a converging form, of which radial width decreases as the position moves in the first or second rotating direction toward its tip end, and has an inner peripheral surface which forms a guide surface 118 and inclines with respect to the rotating direction to form the above diverging form. In other words, the portion of the guide surface 118 at the tip end is located radially outside the portion thereof at the base end. Therefore, the portions of the first and second coil springs 107 and 108 which are in contact with the guide surfaces 118 are located at radially inner positions than the other portions.

The dampers are provided for the torque transmission and for absorbing and damping the minute torsional vibration or the like due to variation in rotation of the engine. The dampers are arranged at four positions, which are equally spaced from each other in the rotating direction. Each damper is formed of the first coil spring 107 (first elastic member), the second coil spring 108 (second elastic member) and an intermediate plate or member 104. The first coil spring 107 is longer in the rotating direction than the second coil spring 108, and has a lower rigidity than the second coil spring 108. This provides the damper characteristics having two stages. In each damper, the first coil spring 107 is located forward, in the first rotating direction R1 with respect to the second coil spring 108. A first spring seat 130 is arranged at the forward end, in view of the first rotating direction R1, of the first coil spring 107. The first spring seat 130 has a circular disk-like support portion and an engagement portion extending from the support portion into the coil spring. The rear surface of the first spring seat 130 is supported by the input support portion formed of the inner engagement portion 114, concavity 115 and outer engagement portion 116 of the drive plate 103. A second spring seat 131 is arranged at the forward end, in the second rotating direction R2, of the second coil spring 108. The second spring seat 131 has the same structure as the first spring seat 130, and is supported by the drive plate 103.

The intermediate plate 104 is operable between the first and second coil springs 107 and 108, and has an intermediate support portion 121, which is arrange between the forward end, in view of the second rotating direction R2, of the first coil spring 107 and the forward end, in the first rotating direction R1, of the second coil spring 108 for allowing transmission of the torque between the first and second coil springs 107 and 108. The middle support portion 121 has a triangular form converging radially inwardly, and inclined support surfaces 121a are formed at its opposite sides in the circumferential direction (R1 and R2). Since the supporting surfaces 121a are inclined, partial or local contact of the support surfaces 121a with the first and second coil springs 107 and 108 are suppressed. Therefore, the first and second coil springs 107 and 108 as well as the intermediate plate 104 can have long lifetimes. The intermediate support portion 121 is provided at its opposite sides in the circumferential direction (R1 and R2) with third movement restricting portions 122 which protrude in the circumferential direction. Each third movement restricting portion 122 extends perpendicularly from the supporting surface 121a.

The third movement restricting portions 122 are fitted into the forward end in the second rotating direction R2 of the first coil spring 107 and the forward end in the first rotating direction R1 of the second coil spring 108, respectively. The third movement restricting portions 122 are in contact with the inner peripheries of the first and second coil springs 107 and 108. The plurality of intermediate support portions 121 are coupled together by the ring 120 functioning as a coupling portion. In this manner, the radially outward movement of each intermediate support portion 121 is restricted. As a result, the radially outward movement of the circumferentially intermediate portion of each damper (i.e., the forward end in the second rotating direction R2 of the first coil spring 107 and the forward end in the first rotating direction R1 of the second coil spring 108) is restricted. Since the intermediate plate 104 is not directly supported by another member, a frictional resistance is unlikely to occur.

The output member is formed of the driven plate 105 and the support ring 106. The driven plate 105 is a member fixed to the turbine shell 153 of the turbine 152, and has an annular portion 105a welded to the turbine shell 153 and a plurality of engagement portions 105b which extend from the annular portion 105a toward the transmission and are inserted between the ends, in the rotating directions, of the dampers. The engage portion 105b extends through the concavity 115 of the drive plate 103, and has the opposite ends in the rotating directions, which are in contact with the first and second spring seats 130 and 131, respectively. Thus, the engagement portions 105b function as an output support portion.

Figure 18:
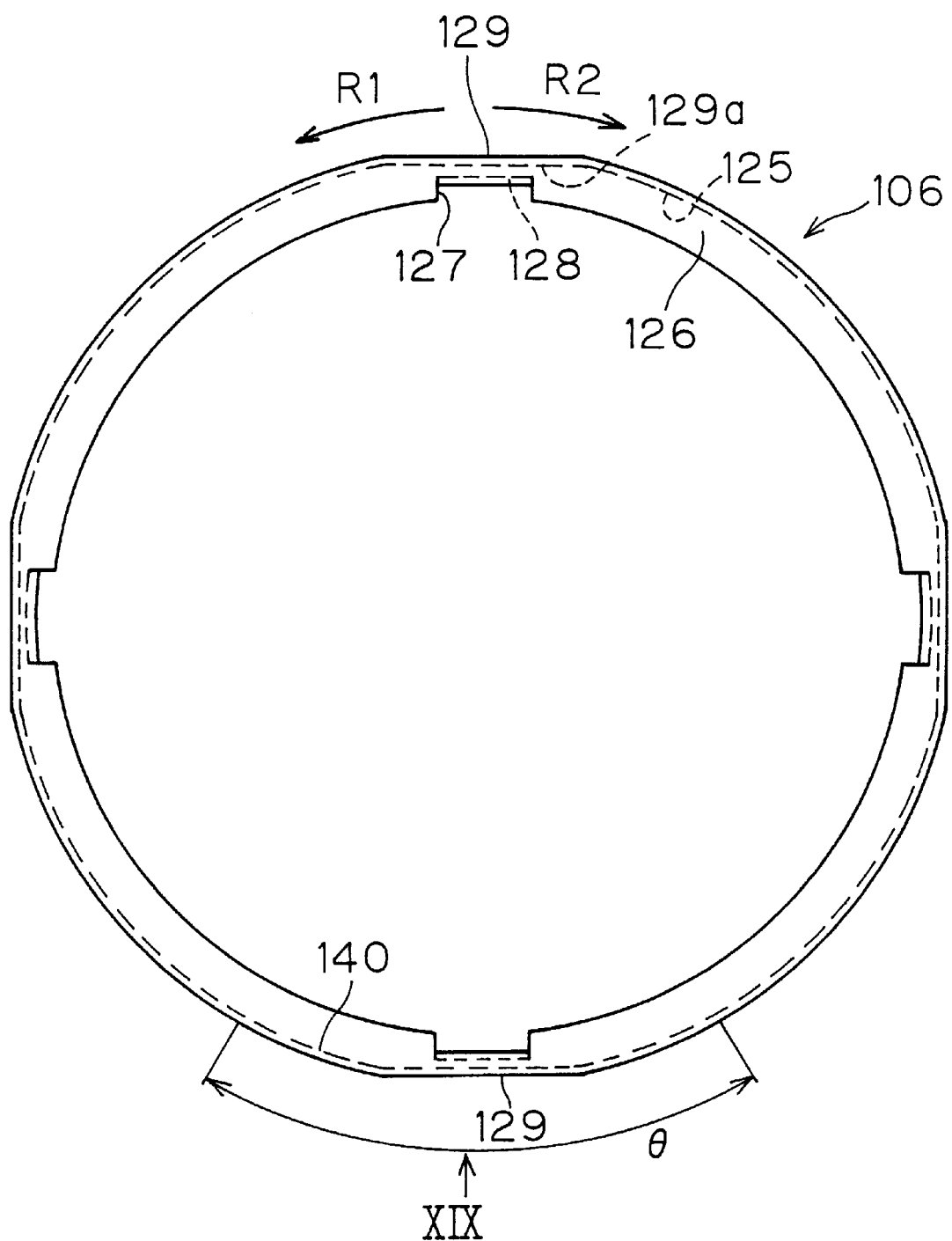
FIG. 18 is an elevation of a support ring in accordance with the fourth embodiment of the present invention depicted in FIGS. 13, 14 and 15, showing the support ring removed from the lockup clutch.
Figure 19:
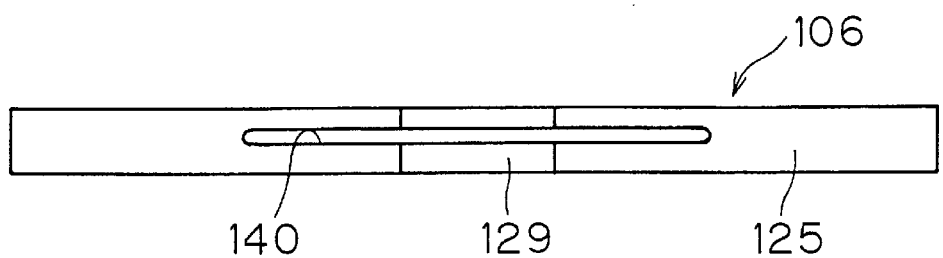
FIG. 19 is a side view of the support ring looking in the direction of the arrow XIX in FIG. 18.

The support ring 106 is an annular metal plate produced by press working as shown in FIGS. 18 and 19, and is basically formed of a cylindrical portion 125 and a circular plate portion 126 extending radially inward from the end of the cylindrical portion 125 near the transmission. The circular plate portion 126 is provided at circumferentially equally spaced four positions of its inner periphery with recessed engagement portions 127. The engagement portions 105b of the driven plates 105 are inserted into and engaged with the recessed engagement portions 127, respectively. Thereby, the support ring rotates together with the driven plate 105. The engagement portion 105b and the recessed engagement portion 127 engaged together are axially disengagable from each other. At each position provided with the recessed engagement portion 127, the circular plate portion 126 is bent toward the transmission to form a spring engagement portion 128. The spring engagement portion 128 supports the first and second spring seats 130 and 131. Thus, the spring engagement portion 128 forms the support portion at the output side together with the engagement portion 105b of the driven plate 105. Since the spring engagement portion 128 and the engagement portion 105b support the first and second coil springs 107 and 108 at radially different positions, an effect similar to that by the support portion at the input side can be achieved.

Figure 20:
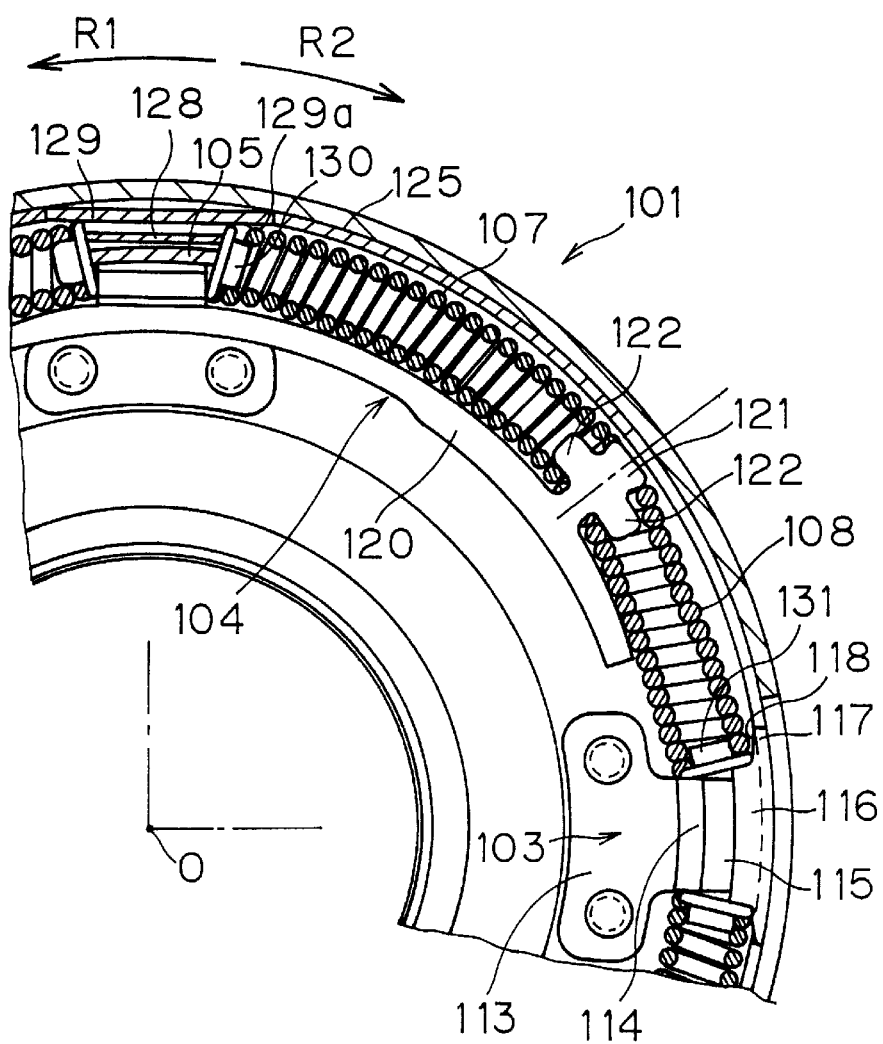
FIG. 20 is a fragmentary cross section view of a lockup mechanism in accordance with the fourth embodiment.

The cylindrical portion 125 is located radially inside the outer projection 112, and covers the outer periphery of each damper, i.e., first and second coil springs 107 and 108. The cylindrical portion 125 is located near the outer projection 112 of the piston 102, but a space is kept between them. The cylindrical portion 125 covers the outer peripheries of the first and second coil springs 107 and 108 to prevent the radially outward disengagement thereof. As shown in FIGS. 13 and 20, a large radial space is kept between the cylindrical portion 125 and the outer peripheries of the first and second coil springs 107 and 108 in the free state. A radial space is also kept between the cylindrical portion 125 and the intermediate support portion 121 of the intermediate plate 104. The cylindrical portion 125 is provided at its four position corresponding to the drive plates 103 with second movement restricting portions 129 which extend linearly through positions radially inside the other arc-shaped portions. The second movement restricting portion 129 extends from the vicinity of the drive plate 103 in the first and second rotating directions, and reaches the positions radially outside the ends of the dampers to cover several turns of the first coil spring 107 at the forward end thereof in the first rotating direction R1 and several turns of the second coil spring 108 at the forward end thereof in the second rotating direction R2. As a result, the ends of the first and second coil springs 107 and 108 are restrained from moving radially outward beyond guide surfaces 129a which are the inner peripheral surfaces of the second movement restricting portions 129. The guide surface 129a of the second movement restricting portion 129 is inclined radially inward with respect to the inner peripheral surfaces of the other arc-shaped portions. More specifically, at portions radially outside the first and second spring seats 130 and 131, the outer portions of the guide surface 129a in the rotating directions are located radially inside the inner portion thereof in the rotating directions. At the ends of the first and second coil springs 107 and 108, therefore, the portions in contact with the guide surfaces 129a are located radially inside the other portions.

The portion forming the second movement restricting portion 129 is provided with a slit 140, which extends through the cylindrical portion 125 in the first and second rotating directions over an angle theta. A radially outer portion of the outer engagement portion 116 of the drive plate 103 is inserted into the slit 140. Thereby, the end of the first movement restricting portion 117 of the outer engagement portion 116 comes into contact with the edge of the slit 140 when the torsion angle between the input and output members increases to a certain value, and thereby the relative rotation between them stops.

Since the driven plate 105 and the support ring 106 are formed of the independent members, respectively, these parts can have simple configurations and structures, although the parts increase in number. Therefore, the whole work for the production can be simpler than that in the case where these parts are formed of a single member.

Operation of the above described device is provided below.

Torque of the crank shaft of the engine is supplied to the front cover 150 via a flexible plate (not shown). The torque is transmitted to the unillustrated impeller. When the impeller rotates, the working fluid flows toward the turbine 152 to rotate the same. The torque of the turbine 152 is output to the main drive shaft through the unillustrated turbine hub.

When the speed ratio of the torque converter increases and the main drive shaft attains a predetermined rotation speed, the working fluid between the piston 102 and the front cover 150 is drained through the interior of the main drive shaft. As a result, a pressure difference presses the piston 102 to the friction surface 151 of the front cover 150. Thereby, the torque of the front cover 150 is transmitted to the turbine 152 through the lockup mechanism 101. Thus, the front cover 150 is mechanically coupled to the turbine 152, and the torque of the front cover 150 is output directly to the main drive shaft without passing through the impeller.

In the engaged state of the lockup clutch, the input support portion of the drive plate 103 pushes the damper in the first rotating direction R1, and the damper pushes the engagement portion 105b of the driven plate 105. Thereby, the torque is transmitted from the piston 102 to the driven plate 105.

In the engaged state of the lockup clutch, the lockup mechanism 101 transmits the torque and also operates to absorb or damp the torsional vibration transmitted from the front cover 150. More specifically, the first and second coil springs 107 and 108 forming the damper expand and contract between the drive plate 103 and the driven plate 105, whereby the torsional vibration is absorbed and damped.

In this embodiment, the first and second coil springs 107 and 108 are coupled to operate in series so that the piston 102 can rotate through a large angle with respect to the driven plate 105. Therefore, large maximum torsion angle characteristics can be ensured in spite of the fact that the dampers are located at the radially outer positions of the torque converter and the lockup mechanism 101. The rigidity (spring constant) of the first coil spring 107 and that of the second coil spring 108 are different from each other and therefore provide the spring characteristics having two stages. Therefore, the input torsional vibration having the amplitude and frequency of various values can be damped efficiently.

Since the entire lockup mechanism 101 rotates in the torque transmitting operation, the first and second coil springs 107 and 108 for absorbing and damping the vibration receive a centrifugal force. This centrifugal force pushes the first and second coil springs 107 and 108 radially outward. Since the first and second coil springs 107 and 108 are arranged in series, the circumferentially middle portion of the damper is likely to protrude radially outward. In this embodiment, however, the circumferentially opposite ends of the damper are supported by the first and second movement restricting portions 117 and 129 so that a frictional resistance is suppressed between the circumferentially opposite ends of the damper and the cylindrical portion 125 of the support ring 106. Further, the third movement restricting portion 122 of the intermediate plate 104 restricts the radially outward movement of the circumferentially middle portion of each damper. As a result, a frictional resistance is suppressed between the circumferentially middle portion of the damper and the cylindrical portion 125. As described above, the damper, which is formed of the first and second coil springs 107 and 108 arranged in series in the rotating direction and thereby has a large maximum torsion angle, has the circumferentially opposite ends and the circumferentially middle portion which are restrained from radial movement. Therefore, the frictional resistance of the first and second coil springs 107 and 108 with respect to the other member (support ring 106) is remarkably reduced as compared with the prior art.

The torsion operation of the lockup mechanism 101 will be described below further in detail. In the following description the driven plate 105 rotates relatively to the piston 102. The driven plate 105 relatively rotates in the second rotating direction R2 from the neutral or initial position in FIG. 20. In this case, the engagement portion 105*b* and the spring engagement portion 128 push the first spring seat 130 in the second rotating direction R2. In this operation, the forward end in the first rotating direction R1 of the first coil spring 107 and the cylindrical portion 125 move in the substantially same direction as the driven plate 105 so that a frictional resistance is unlikely to occur between the first coil spring 107 and the cylindrical portion 125. While the torsion angle is small, the first coil spring 107 of a low rigidity is compressed to a large extent, and the second coil spring 108 is compressed only to a small extent. Although a speed difference is present between the second coil spring 108 and the cylindrical portion 125, the forward end in the second rotating direction R2 of the second coil spring 108 is supported by the first movement restricting portion 117 of the drive plate 103, and therefore is restrained from radially outward movement so that the frictional resistance is unlikely to occur between the second coil spring 108 and the cylindrical portion 125. When the torsional angle further increases, the first movement restricting portion 117 of the drive plate 103 comes into contact with the edge of the slit 140 of the cylindrical portion 125 so that the relative rotation between the piston 102 and the driven plate 105 stops.

Since the first movement restricting portion 117 is provided with the guide surface 118, the outer peripheral surface of the forward end in the second rotating R2 of the compressed second coil spring 108 is guided radially inward by the guide surface 118. Since the second movement restricting portion 129 is provided with the guide surface 129*a*, the outer peripheral surface of the forward end in the first rotating R1 of the first coil spring 107 is guided radially inward by the guide surface 129*a*. The guide surfaces 118 and 129*a* also guide radially inwardly the ends of the first and second coil springs 107 and 108 to move then smoothly to the initial positions when the compressed coil springs 107 and 108 expand toward the initial forms to bring their ends into contact with the first and second movement restricting portions 117 and 129 again. Therefore, even in such a structure that the first movement restricting portions do not restrict the radially outward movement of the opposite ends of the first and second coil springs in the free state (i.e., the opposite ends are spaced from the support portions of the input or output member), the guide surfaces reliably guide radially inwardly the ends of the first and second elastic members when these members are compressed so that the a sufficient space can be kept by the first and second elastic members with respect to the members arranged radially outside them. As a result, an unnecessary frictional resistance is unlikely to occur when the torsional vibration is transmitted.

Since the first movement restricting portion 117 is formed of the projection at the outer periphery of the drive plate 103, this portion has a simple structure and therefore can be processed easily. The second movement restricting portion 129 also has a simple structure which can be produced by slightly deforming the cylindrical portion 125. As described above, the simple structures allowing easy processing are used for supporting the circumferentially opposite ends of each damper for reducing an unnecessary frictional resistance.

The first and second movement restricting portions 117 and 129 are arranged radially outside the forward end in the first rotating direction R1 of the first coil spring 107 and the forward end in the second rotating direction R2 of the second coil spring 108, and restrict the radially outward movement of these ends by the contact with the outer peripheries of these ends. Therefore, a superior effect can be achieved by the simple structures.

The cylindrical portion covering the outer periphery of the damper may be provided at the input member or the intermediate member.

According to the invention, the seat member for restricting the radially outward movement of the elastic member is employed so that the frictional resistance between the ends of the elastic member and the other member arranged radially outside the elastic member is suppressed, and the minute torsional vibration can be effectively absorbed.

Also, the invention employs such a structure that the above frictional resistance between the input member and the output member is suppressed during the relative rotation in one of the relatively rotating directions, and the frictional resistance is generated during the opposite direction. Thereby, such an effect can be achieved in addition to the above effect that a relatively large vibration which occurs during engaging and disengaging operations of the clutch can be effectively damped.

In the lockup mechanism of the torque converter according to another aspect of the invention, the first movement restricting portion provided at the input member and the second movement restricting portion provided at the output member always restrict the radially outward movement of the opposite ends of the first and second elastic members when these elastic members are compressed in accordance with the relative rotation between the input and output members. As a result, a frictional resistance of the first and second elastic members with respect to the other members is reduced.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A lock-up mechanism for use in a torque converter, the torque converter having a front cover and an impeller that together form a working fluid chamber, the torque converter having a turbine disposed in the chamber facing the impeller, the lock-up mechanism comprising:

a piston member disposed between the front cover and the turbine for selective connection with a portion of the front cover;

an input member fixed to said piston member on a side of said input member opposite said front cover and near the turbine;

an output member fixed to the turbine for outputting torque to the turbine;

a plurality of elastic members for transmitting the torque from said input member to said output member, ends of said elastic members in a rotational direction contact said input member and said output member;

a support member disposed on said output member rotatable together with the turbine, said support member for restricting said ends of said elastic members against radially outward movement.

2. The lock-up mechanism according to claim 1, wherein said support member has a generally cylindrical shaped portion that encircles radially outward portions of said elastic members, said cylindrical shaped portion having alternating arcuate portions and restriction portions, said restriction portions being extending between adjacent ends of said elastic members, each of said restriction portion extending radially inward between pairs of said arcuate portions, said restriction portion configured to restrict radially outward movement of said ends of elastic members.

3. The lock-up mechanism according to claim 2, wherein said restriction portions are formed straight extending in an axial direction with respect to the torque converter.

4. The lock-up mechanism according to claim 1, wherein said support member is engaged with said output member such that said support member and said output member rotate together but may undergo movement with respect to one another in the axial direction.

5. The lock-up mechanism according to claim 1, wherein said support member is engaged with said input member such that said support member and said input member may undergo limited relative rotation with respect to one another.

6. The lock-up mechanism according to claim 5, wherein a portion of said support member and a portion said input member form a stopper that limits torsional displacement therebetween within a predetermined torsional angle.

7. The lock-up mechanism according to claim 1, wherein said output member comprises a plurality of output members fixed to the turbine at circumferentially spaced apart locations, each of said output members extending between ends of adjacent ones of said plurality of elastic members.

8. The lock-up mechanism according to claim 7, wherein each of said output members includes a restriction portion that restricts radially outward movement of ends of said adjacent ones of said elastic members.

9. The lock-up mechanism according to claim 8, wherein said restriction portions of said output members contact radially outward portions of seat members disposed in said ends of said elastic members.

* * * * *